(12) United States Patent
Rossman

(10) Patent No.: US 8,395,298 B2
(45) Date of Patent: Mar. 12, 2013

(54) RADIOISOTOPE FUELED ROTARY ACTUATOR FOR MICRO AND NANO VEHICLES

(75) Inventor: Court E. Rossman, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 360 days.

(21) Appl. No.: 12/819,412

(22) Filed: Jun. 21, 2010

(65) Prior Publication Data

US 2012/0175999 A1   Jul. 12, 2012

(51) Int. Cl.
*H02N 1/00* (2006.01)
*G21H 1/00* (2006.01)

(52) U.S. Cl. .................................. 310/309; 310/305
(58) Field of Classification Search .................. 310/309, 310/305
See application file for complete search history.

(56) References Cited

U.S. PATENT DOCUMENTS

| | | | |
|---|---|---|---|
| 3,696,258 A * | 10/1972 | Anderson et al. | 310/308 |
| 4,642,504 A * | 2/1987 | Jacobsen | 310/308 |
| 6,082,671 A | 7/2000 | Michelson | |
| 6,297,579 B1 * | 10/2001 | Martin et al. | 310/330 |
| 6,479,920 B1 | 11/2002 | Lal et al. | |
| 6,524,232 B1 * | 2/2003 | Tang et al. | 600/3 |
| 7,486,000 B1 * | 2/2009 | Hacsi | 310/309 |

OTHER PUBLICATIONS

"Energy-Efficient Technologies for the Dismounted Soldier", National Academy Press, 1997, p. 217, Washington D.C.
Blanchard, Jake, "Radioisotope Batteries for MEMS", University of Wisconsin, Jan. 2005, 31 pgs.

* cited by examiner

*Primary Examiner* — Tran Nguyen
*Assistant Examiner* — Thomas Truong
(74) *Attorney, Agent, or Firm* — Maine Cernota & Rardin; David A. Rardin

(57) ABSTRACT

The invention provides an actuator apparatus and method where a source provides electrons to a target material wherein electrical work is performed. A beta emission process comprises a source material emitting electrons which are then captured by a target material. The actuator's source vanes rotate within an electric field between the target chutes' walls, generating torque. The principal providing torque and power is the change in energy as a vane gets closer to the outer walls. During the release and capture process, electrical work is performed which, in turn, is transferred into mechanical work in the form of rotation of the rotor. Specific applications include a radioisotope fueled rotary actuator for micro and nano air vehicles employed as the main form of propulsion.

18 Claims, 42 Drawing Sheets

DISK ROTARY EMBODIMENT ONE, 3D PERSPECTIVE VIEW

100
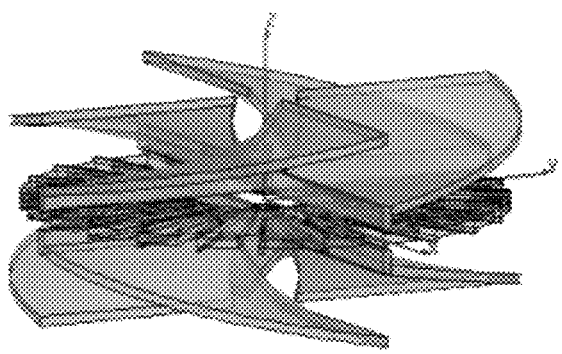
DISK ROTOR EMBODIMENT ONE
FIG. 1A
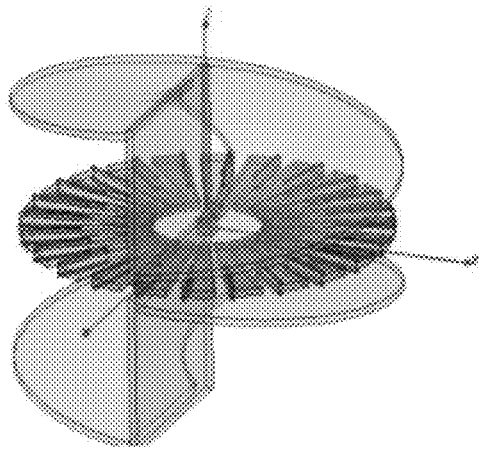
ROTARY EMBODIMENT TWO
FIG. 1B
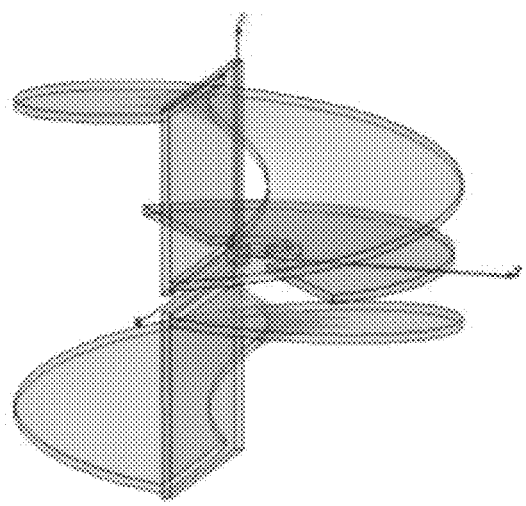
ROTARY EMBODIMENT THREE
FIG. 1C
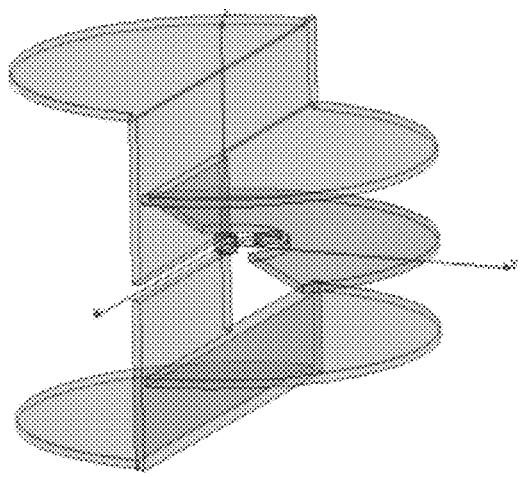
ROTARY EMBODIMENT FOUR
FIG. 1D
ACTUATOR EMBODIMENTS
FIG. 1

200
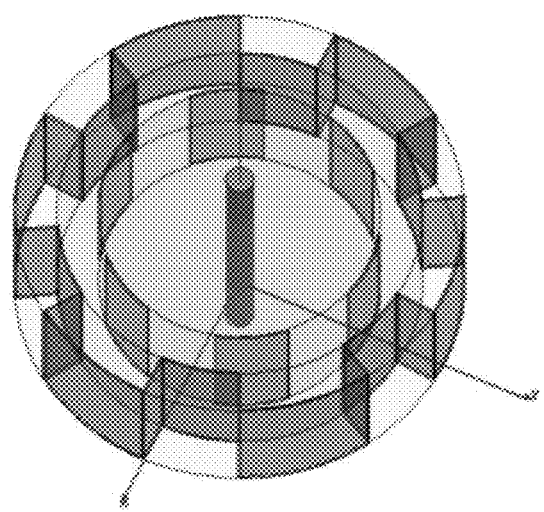
ROTOR EMBODIMENT FIVE
FIG. 2A
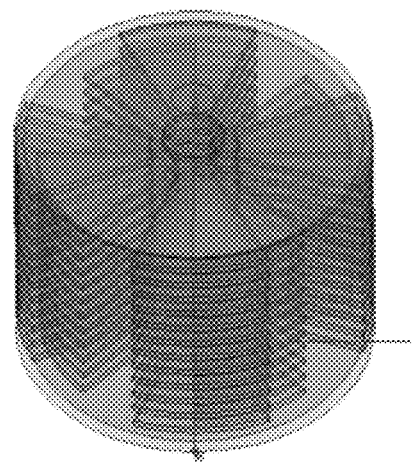
STACKED ROTOR EMBODIMENT SIX
FIG. 2B
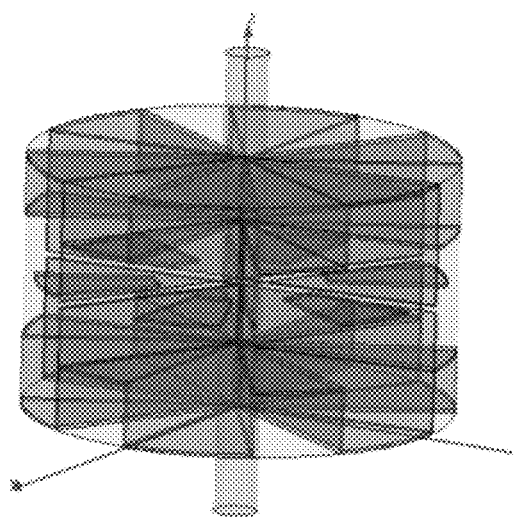
ROTARY EMBODIMENT SEVEN
FIG. 2C
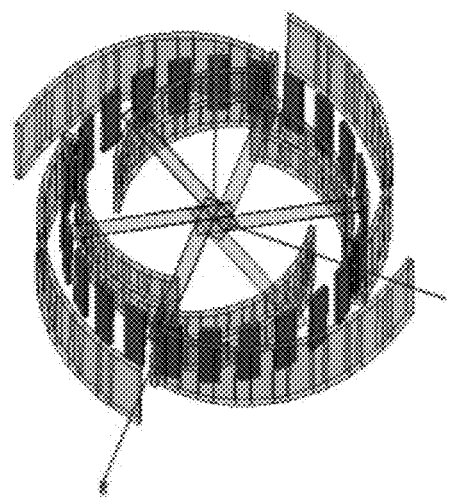
VERTICAL WALL ROTOR EMBODIMENT
FIG. 2D
ACTUATOR EMBODIMENTS
FIG. 2

DISK ROTARY EMBODIMENT ONE, 3D PERSPECTIVE VIEW

DISK ROTARY EMBODIMENT ONE, TOP VIEW VANES

DISK ROTARY EMBODIMENT ONE, SIDE VIEW

600
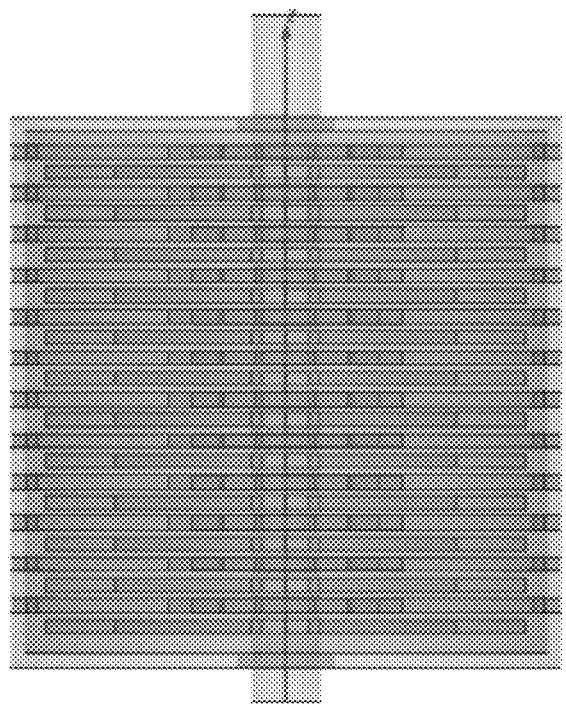
ROTARY EMBODIMENT SIX, SIDE VIEW FIG. 6A
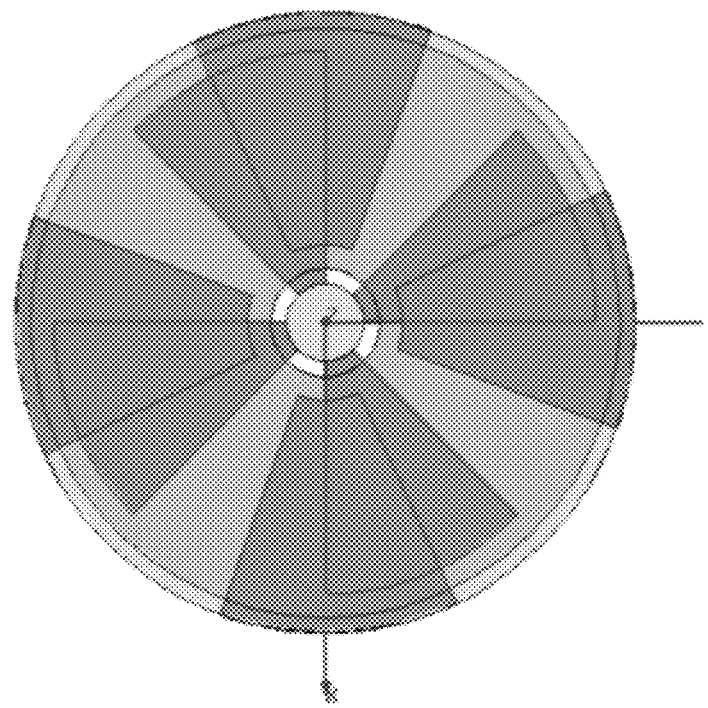
ROTARY EMBODIMENT SIX, TOP VIEW FIG. 6B
ADDITIONAL ROTARY EMBODIMENT VIEWS
FIG. 6

700
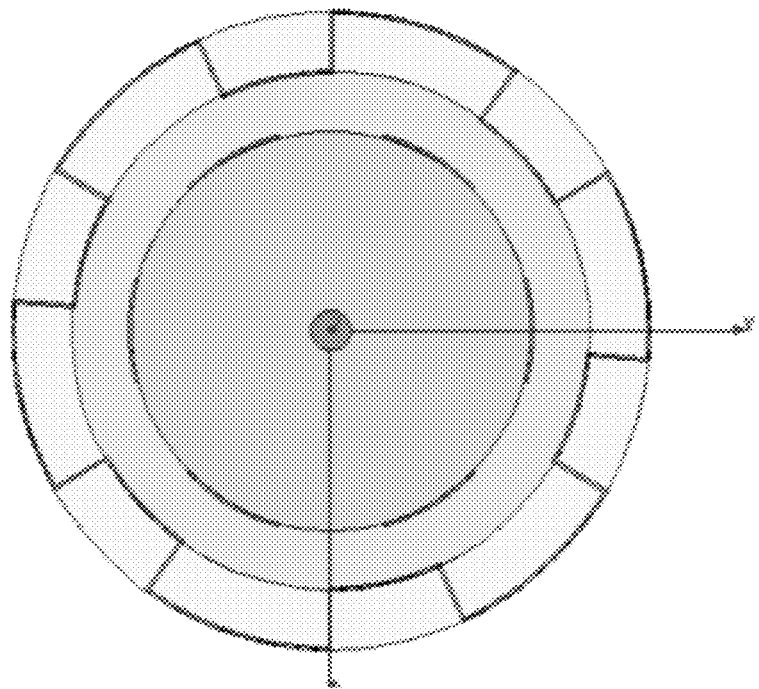
ROTARY EMBODIMENT FIVE, TOP VIEW FIG. 7A
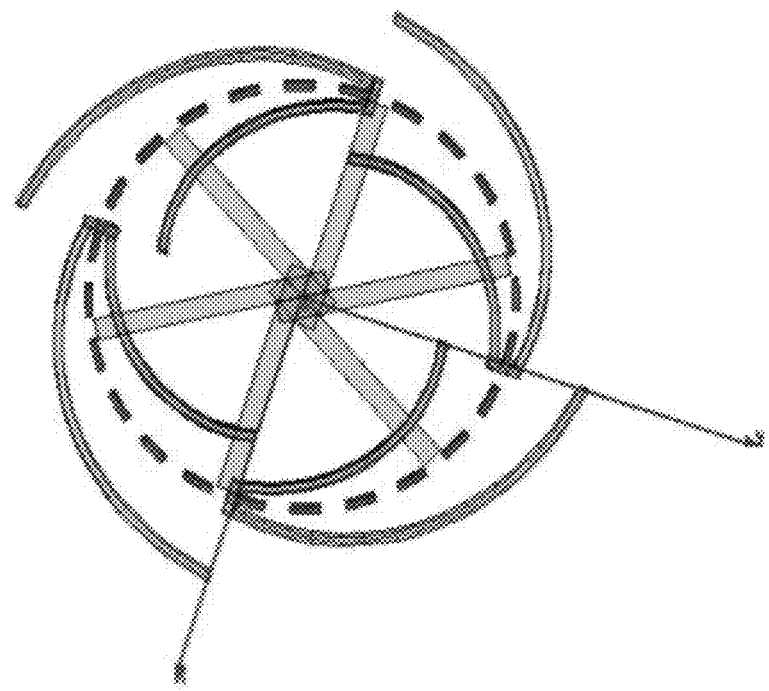
VERTICAL WALL ROTOR EMBODIMENT, TOP VIEW FIG. 7B
ADDITIONAL ROTARY EMBODIMENT VIEWS
FIG. 7

800
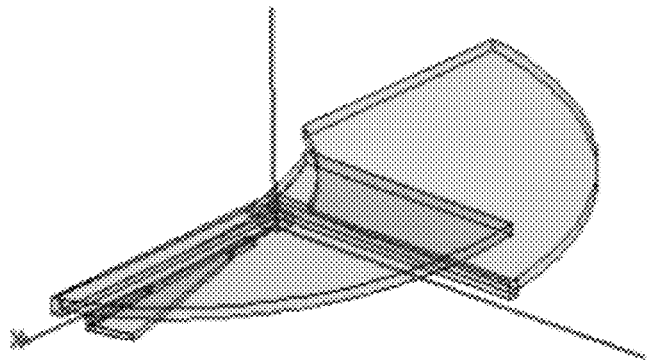
-85 DEGREES FIG. 8A
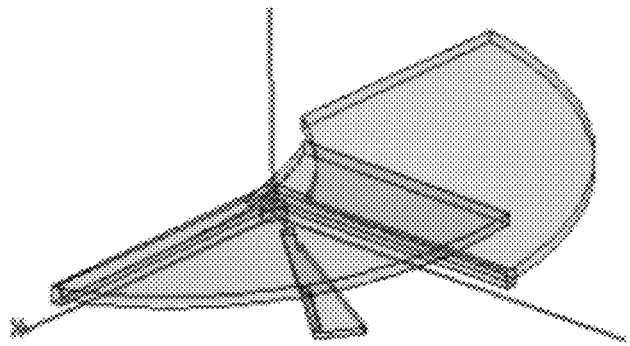
40 DEGREES FIG. 8B
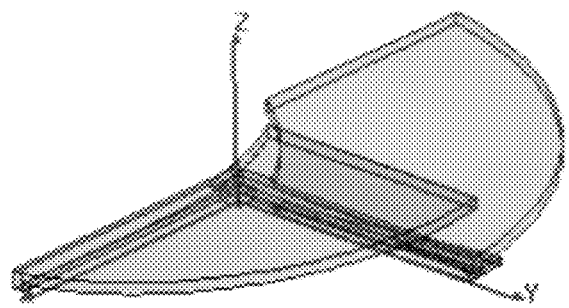
0 DEGREES FIG. 8C
CAPACITANCE VS. ROTATION
FIG. 8

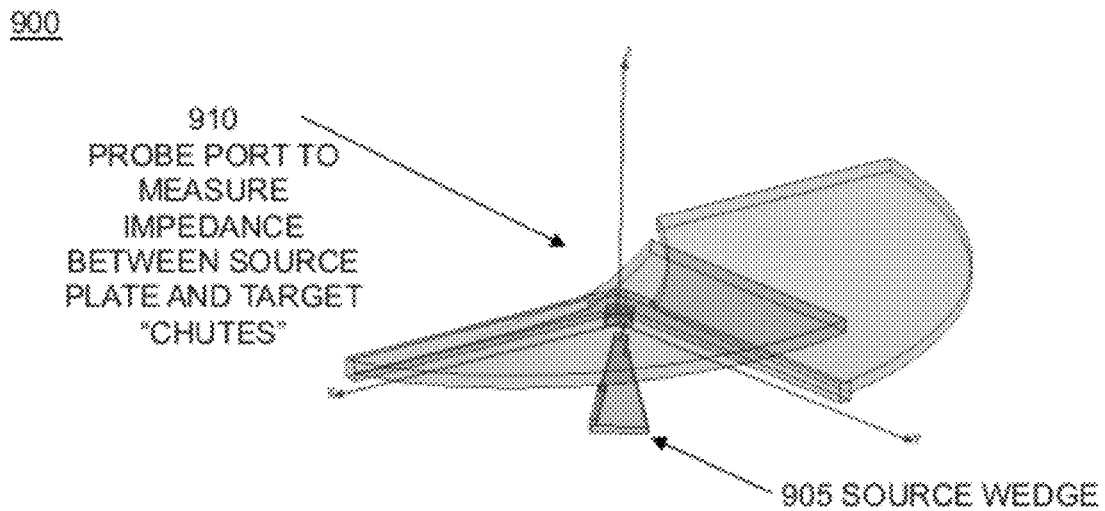
SOURCE WEDGE FIG. 9A
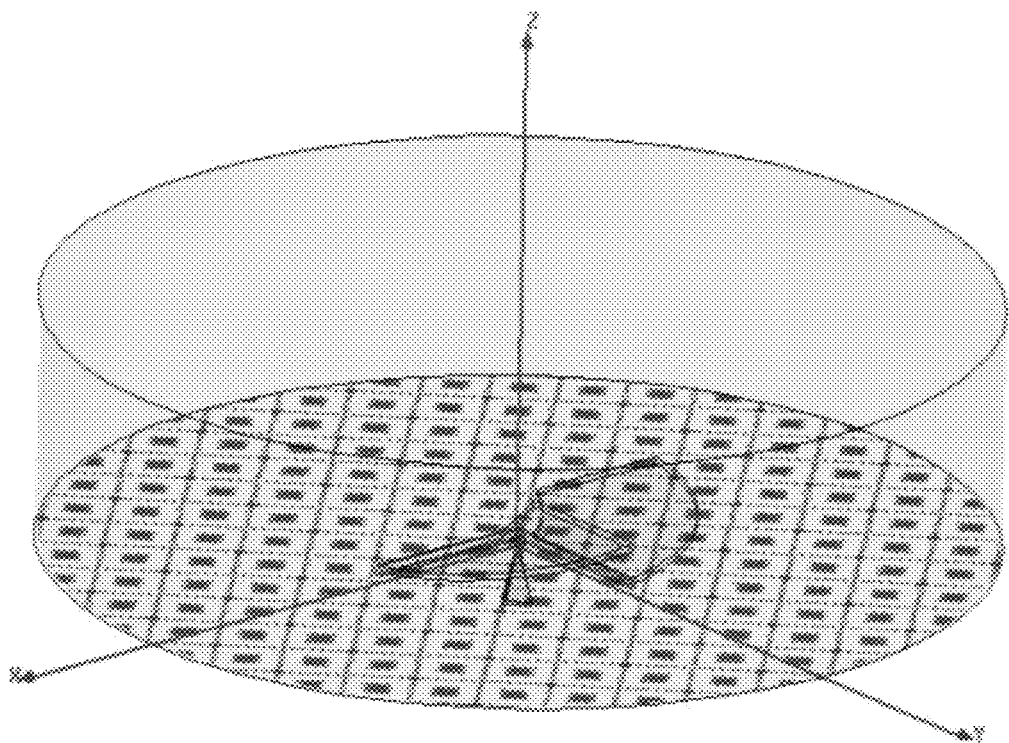
SYMMETRY PLANE UNDERNEATH (E PARALLEL) FIG. 9B
FEM MODEL ROTARY EMBODIMENT ONE
FIG. 9

FEM CAPACITANCE PREDICTIONS ROTARY MOTOR

1100
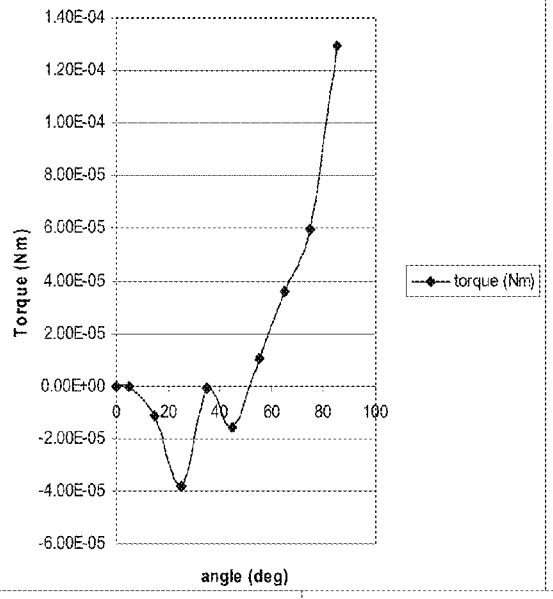
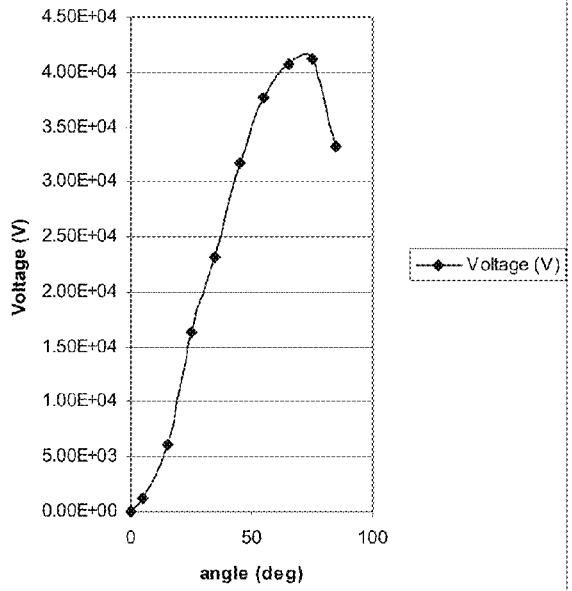 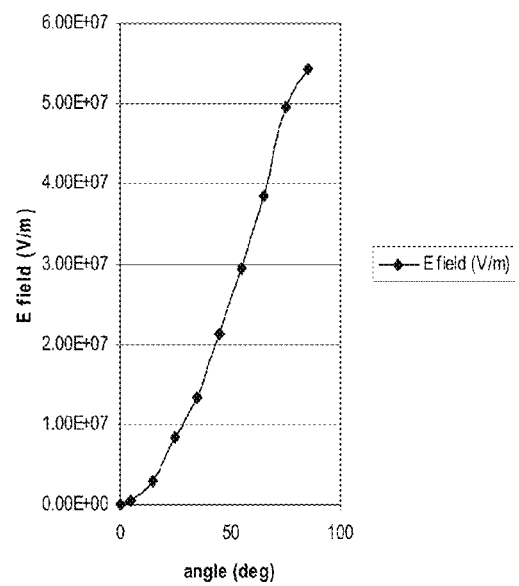
CAPACITANCE VS. ROTATION FOR ROTARY MOTOR
FIG. 11

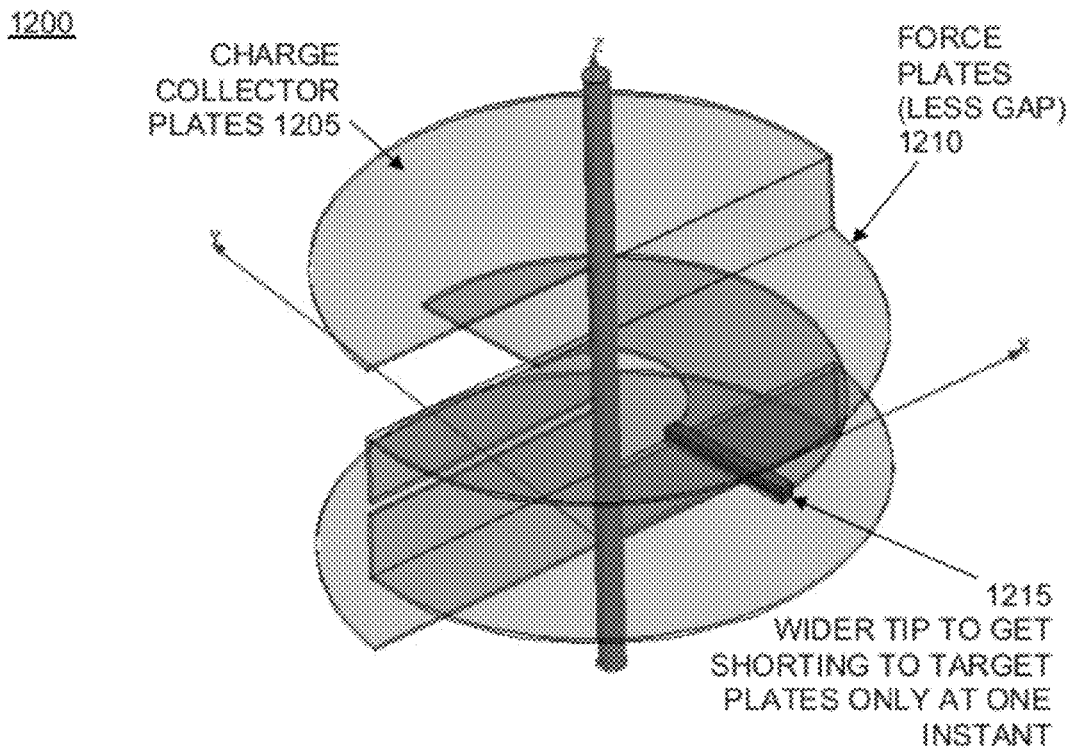
FIG. 12A COLLECTOR PLATES & FORCE PLATES
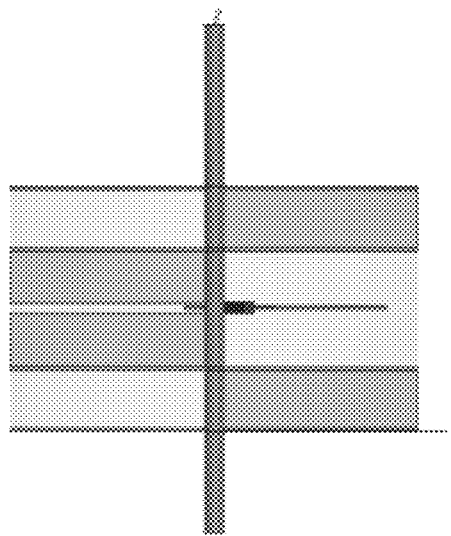
FIG. 12B SIDE VIEW
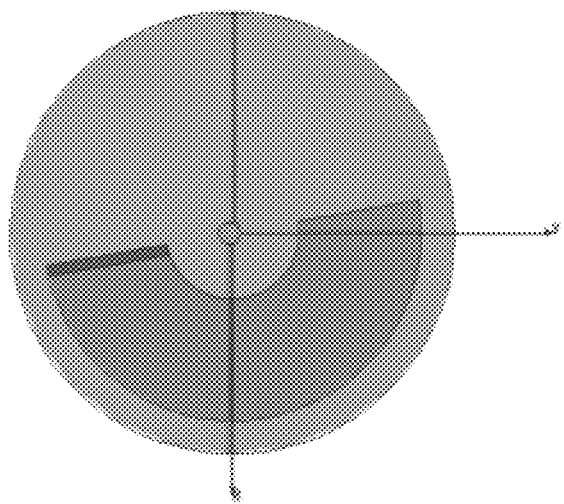
FIG. 12C TOP VIEW
RADIOISOTOPE ENERGY ANALYSIS DIAGRAMS
FIG. 12

POWER DECAY

MAXIMUM BETA ENERGY OF SOURCE DISK BY RADIOISOTOPE

1500
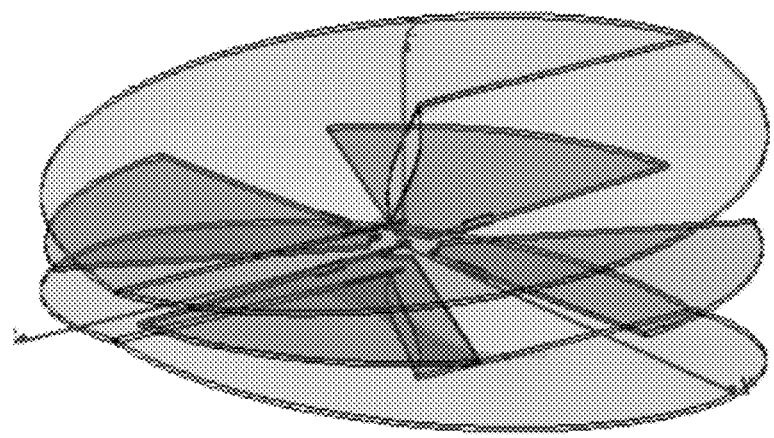
FIG. 15A PERSPECTIVE, ONE CHUTE, FOUR SOURCE VANES
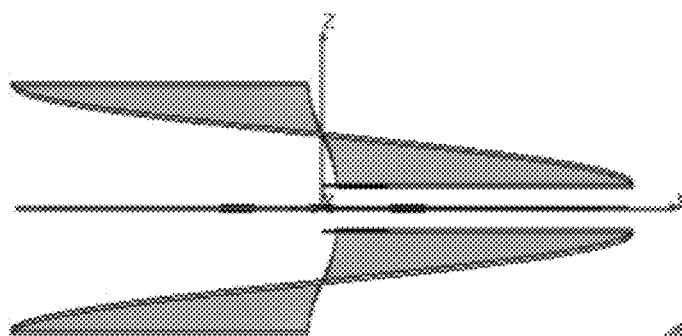
FIG. 15B SIDE VIEW
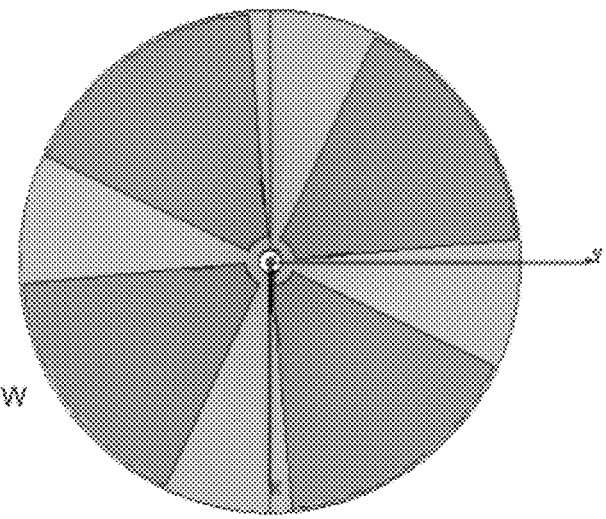
FIG. 15C TOP VIEW
PARTIAL DISCHARGE WITH LOW CURRENT EMBODIMENT DIAGRAMS
FIG. 15

1700
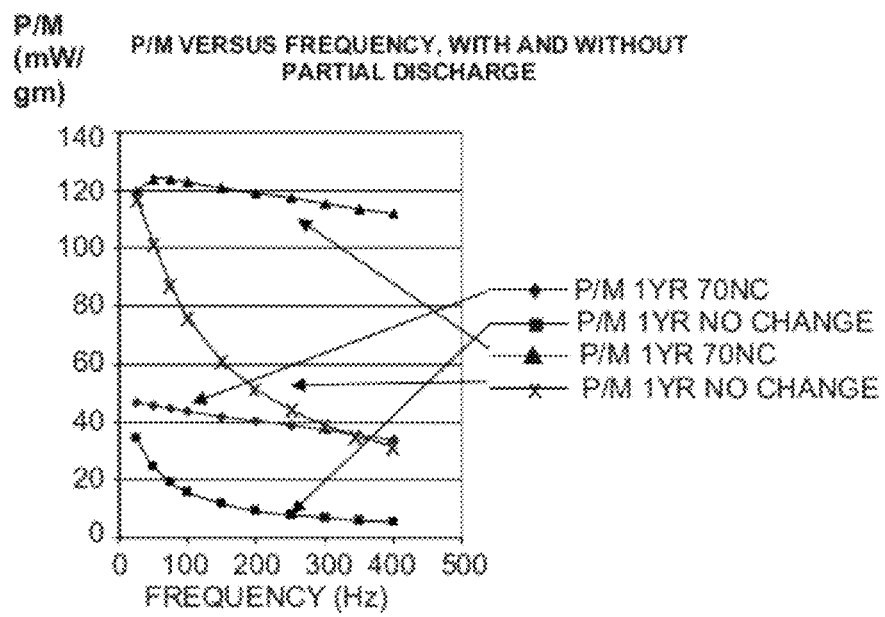
FIG. 17A P/M VERSUS FREQUENCY FOR FULL & PARTIAL DISCHARGE FOR Sn123
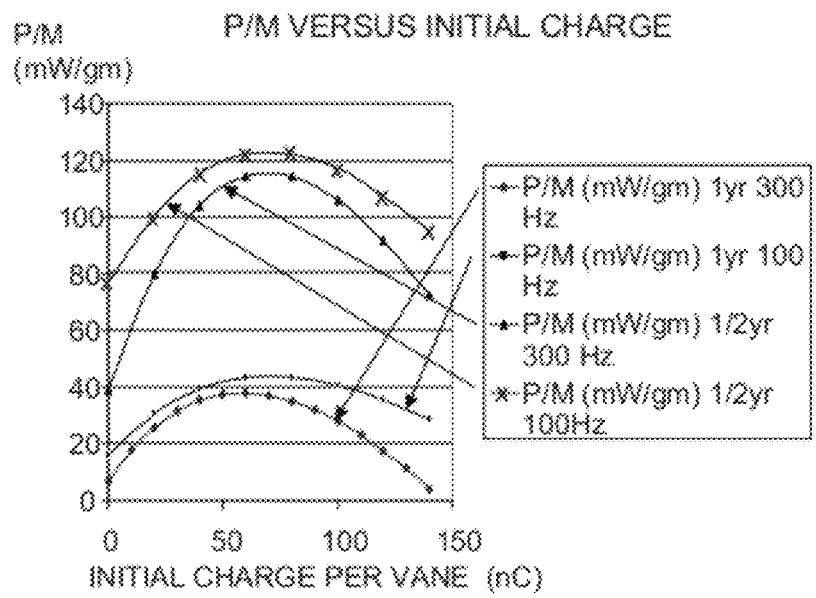
FIG. 17B P/M VERSUS INITIAL CHARGE FOR Sn123
Sn123 PARTIAL DISCHARGE WITH LOW CURRENT
FIG. 17

ROTOR PARTIAL DISCHARGE WITH LOW CURRENT

1900

E FIELD SLIGHTLY LARGER AT END OF CYCLE, WHICH YIELDS NET TORQUE IN ONE DIRECTION

VOLTAGE SHOULD OSCILLATE AROUND LEVEL OF MAXIMUM VI PRODUCT

ROTARY ACTUATOR, Sn123, ½ YEAR, 375 Hz, PARTIAL DISCHARGE

1900

CURRENT

ROTARY ACTUATOR, Sn123, ½ YEAR, 375 Hz, PARTIAL DISCHARGE

TORQUE SLIGHTLY LARGER AT END OF CYCLE

ROTARY ACTUATOR, Sn123, ½ YEAR, 375 Hz, PARTIAL DISCHARGE

CAPACITANCE PER SOURCE VANE

ROTARY ACTUATOR, Sn123, ½ YEAR, 375 Hz, PARTIAL DISCHARGE

GAP NARROWS AT THE PARTIAL
DISCHARGE LOCATIONS

ROTARY ACTUATOR, Sn123, ½ YEAR, 375 Hz, PARTIAL DISCHARGE

CHARGE INCREASES 10% OVER THE CYCLE TIME, OVER THE INITIAL CHARGE

ROTARY ACTUATOR, Sn123, ½ YEAR, 375 Hz, PARTIAL DISCHARGE

ROTARY ACTUATOR POWER WITH PARTIAL DISCHARGE

2200

FINITE ELEMENT MODEL (FEM) RESULTS
CAPACITANCE VS ROTATION, FULL DISCHARGE, ALL VANES PRESENT

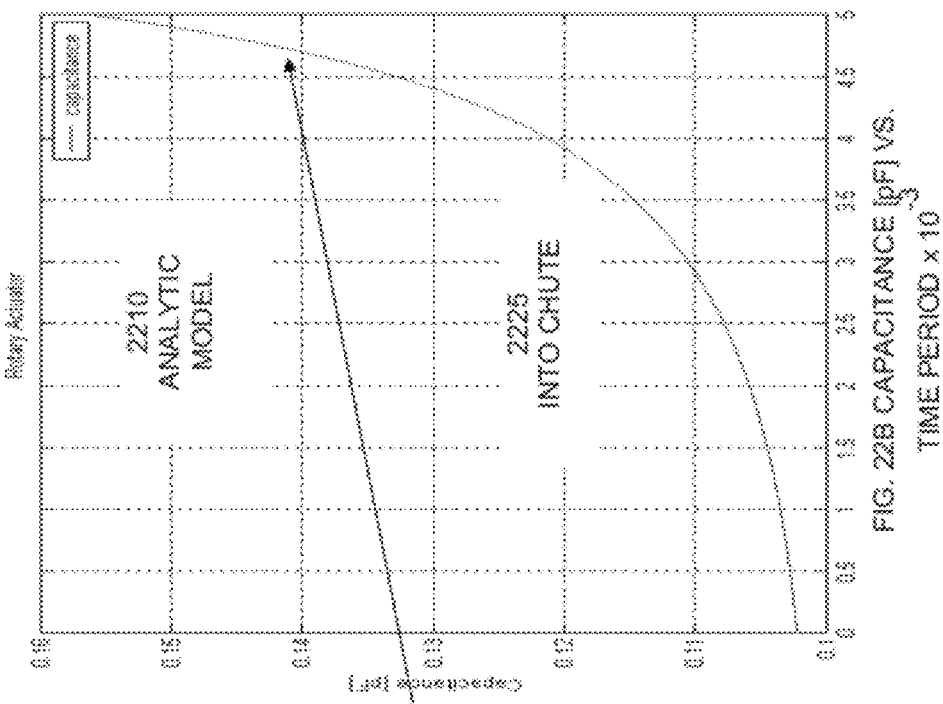
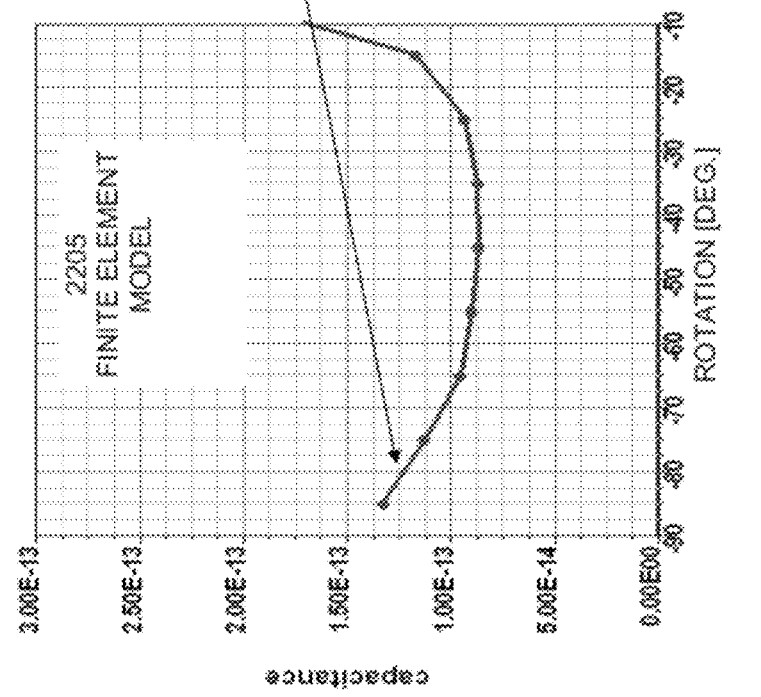
FIG. 22A CAPACITANCE V. ROTATION ANGLE
FIG. 22B CAPACITANCE [pF] VS. TIME PERIOD × 10³
CAPACITANCE VS ROTATION, FULL DISCHARGE, ALL VANES PRESENT

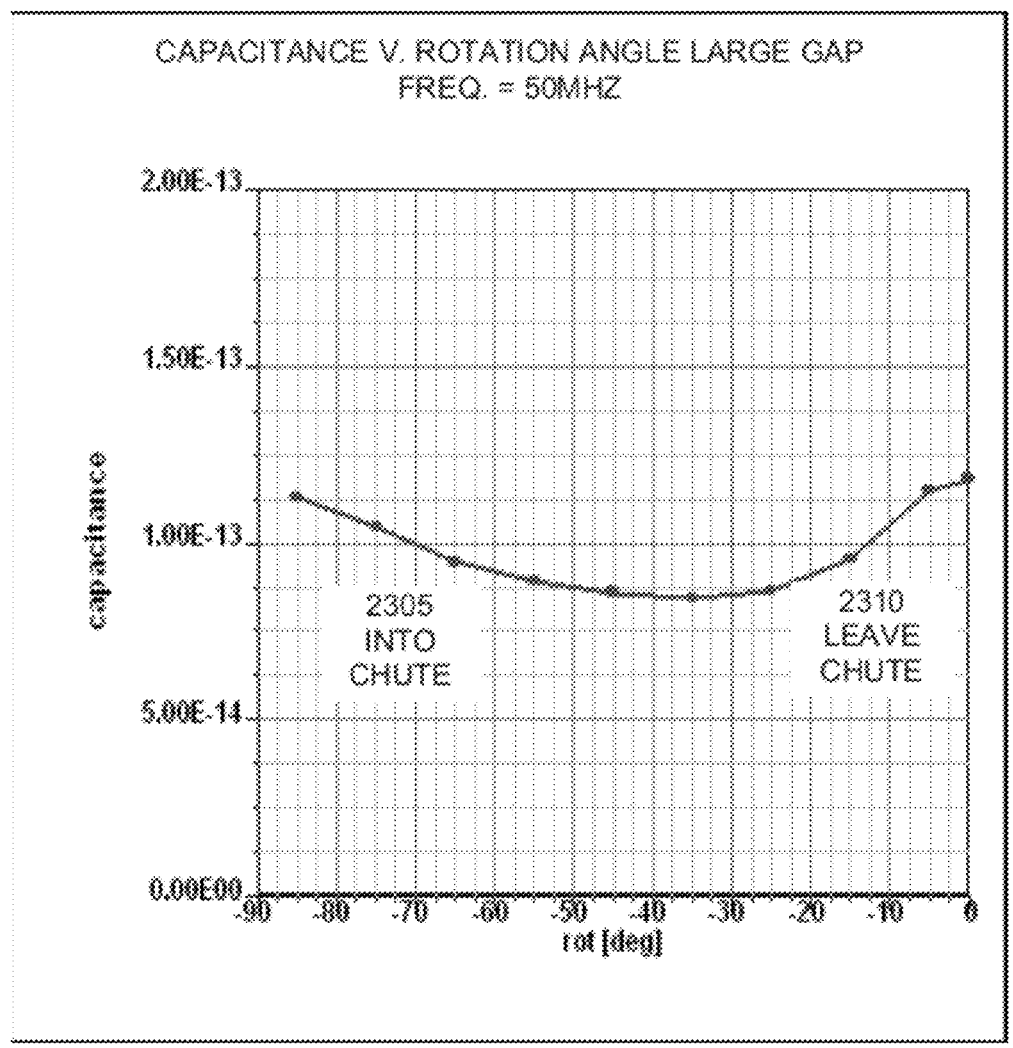
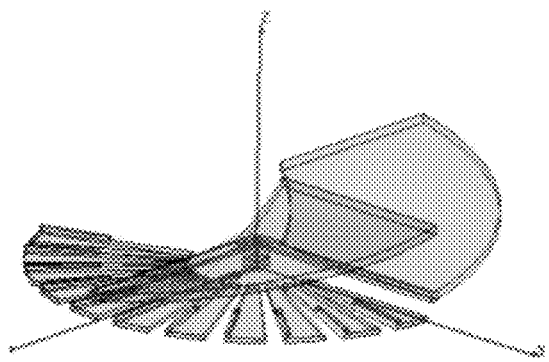
CAPACITANCE VS. ROTATION, PARTIAL DISCHARGE, ALL VANES PRESENT
FIG. 23

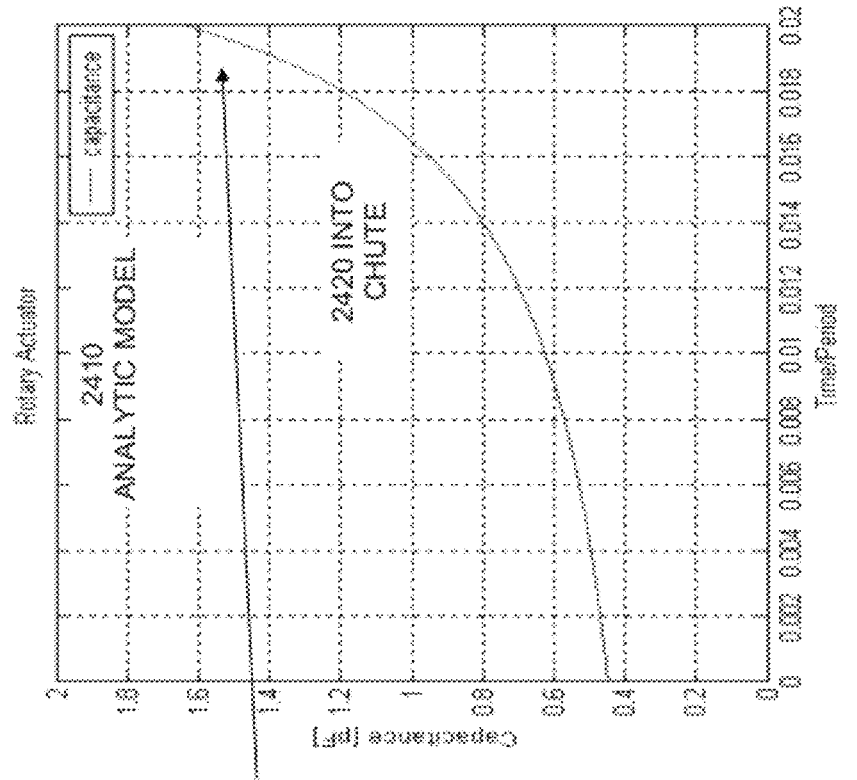
FIG. 24A CAPACITANCE VS. ROTATION
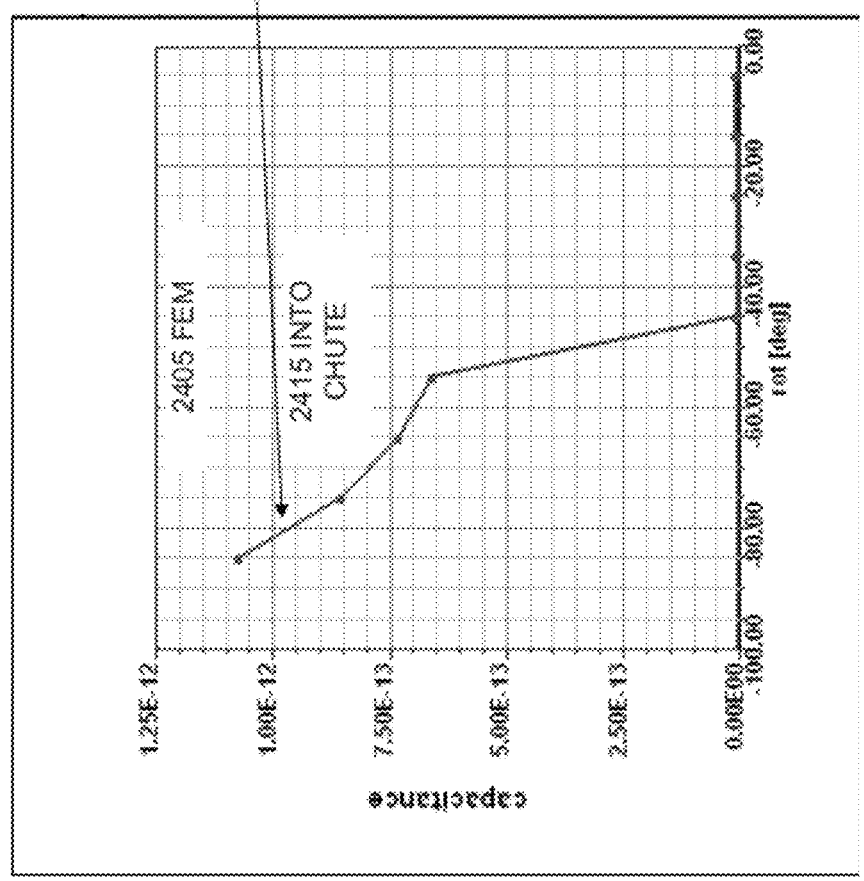
FIG. 24B CAPACITANCE [pF] VS. TIME PERIOD
LOW CURRENT EMBODIMENT

2400

LOW CURRENT EMBODIMENT

PASCHEN CURVES

2600

| ENERGY MeV | SPECIFIC IONIZATION IN AIR, ION PAIR/cm | | | RANGES, cm | | | |
|---|---|---|---|---|---|---|---|
| | | | | ALPHA PARTICLE | | BETA PARTICLE | |
| | ALPHA | ELECTRON | BETA | AIR | SOFT TISSUE | AIR | SOFT TISSUE |
| 0.01 | ..... | 750 | 2100 | ...... | .... | 0.22 | 0.00025 |
| 0.05 | 31000 | 220 | 900 | 0.06 | .... | 3.80 | 0.0043 |
| 0.10 | 39000 | 140 | 540 | 0.10 | .... | 13.00 | 0.014 |
| 0.40 | 61000 | 72 | 175 | 0.26 | .... | 110.00 | 0.13 |
| 0.60 | 68000 | 66 | 130 | 0.34 | .... | 200.00 | 0.23 |
| 0.80 | 71000 | 64 | 110 | 0.43 | .... | 290.00 | 0.33 |
| 1.00 | 71000 | 63 | 97 | 0.52 | 0.0007 | 380.00 | 0.43 |
| 1.20 | 69000 | 63 | 89 | 0.60 | 0.0008 | 470.00 | 0.54 |
| 1.50 | 62000 | 64 | 80 | 0.74 | 0.0009 | 610.00 | 0.7 |
| 2.00 | 52000 | 66 | 73 | 1.01 | 0.0012 | 840.00 | 0.96 |
| IONIZATION AND RANGES OF ALPHA AND BETA PARTICLES | | | | | | | |

IONIZATION TABLE
FIG. 26

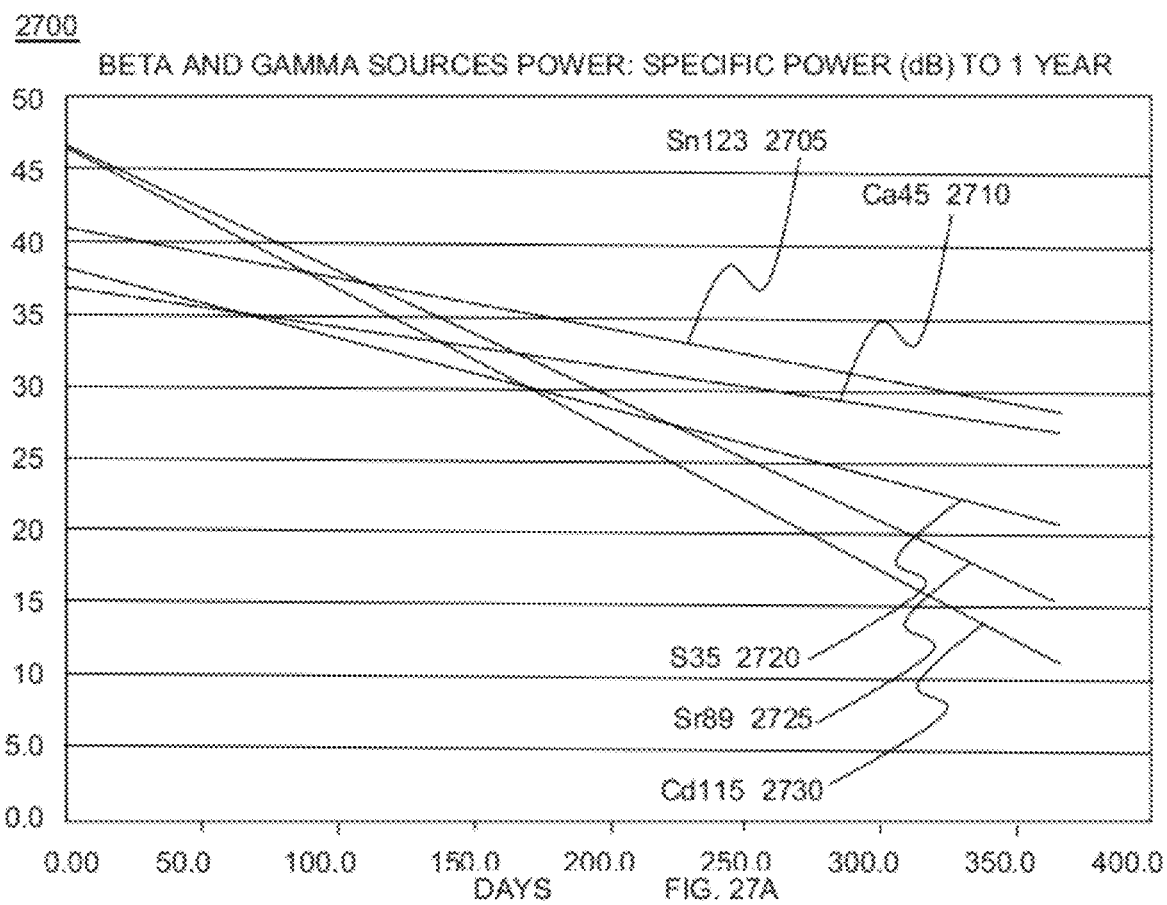
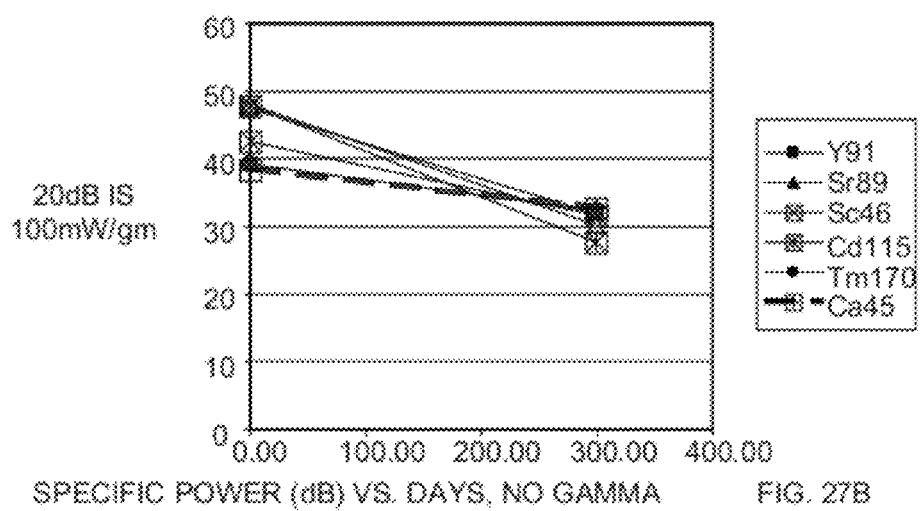
FIG. 27

3000
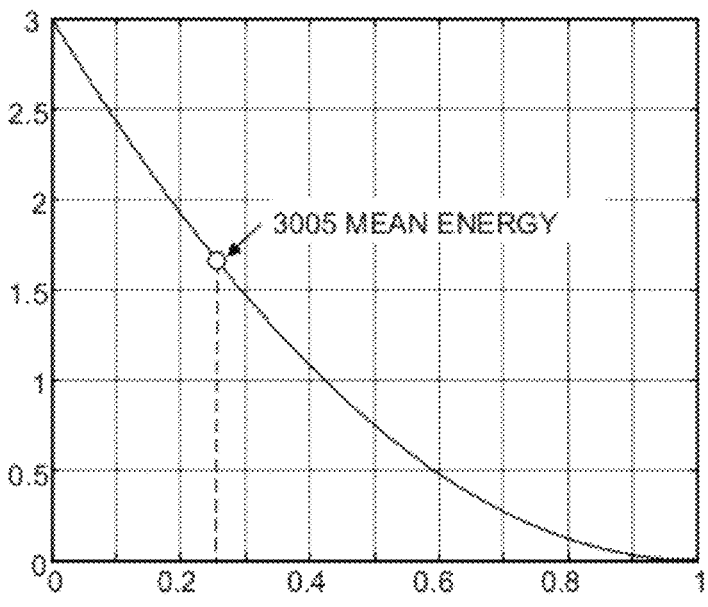
FIG. 30A
APPROX. BETA-ELECTRON KINETIC ENERGY SPECTRUM FOR BETA EMITTERS
AVG. COLLECTED BETA-ELECTRON ENERGY VS. COLLECTION VOLTAGE
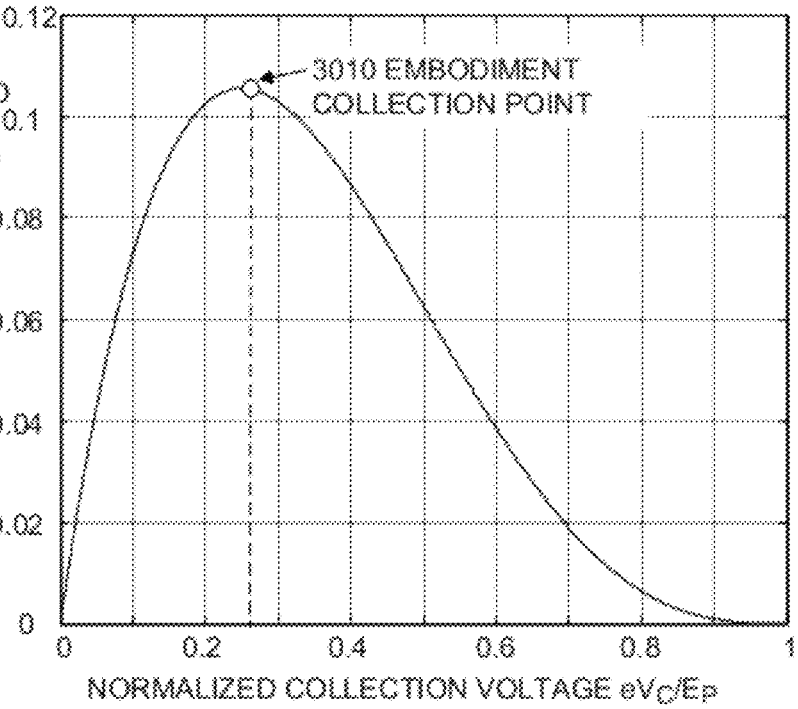
FIG. 30B
FIG. 30

3100

| Level | 4 Be | 6 C | 13 Al | 14 Si | 22 Ti | 25 Mn | 26 Fe | 27 Co | 28 Ni | 29 Cu |
|---|---|---|---|---|---|---|---|---|---|---|
| K | 0.111 | 0.283 | 1.559 | 1.84 | 4.966 | 6.539 | 7112 | 7.709 | 8.332 | 8.979 |
| L I |  |  | 0.117 | 0.148 | 0.563 | 0.769 | 0.846 | 0.925 | 1.008 | 1.096 |
| L II |  | 0.006 | 0.073 | 0.099 | 0.461 | 0.651 | 0.721 | 0.793 | 0.871 | 0.951 |
| L III |  |  |  |  | 0.455 | 0.64 | 0.708 | 0.778 | 0.854 | 0.931 |

TABLE OF CHARACTERISTIC RADIATION FROM METALLIC ELEMENTS, IN keV
FIG. 31A

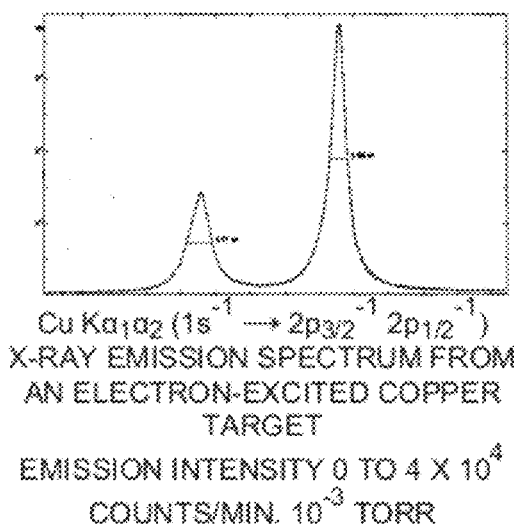

Cu K$\alpha_1\alpha_2$ (1s$^{-1}$ → 2p$_{3/2}^{-1}$ 2p$_{1/2}^{-1}$)
X-RAY EMISSION SPECTRUM FROM
AN ELECTRON-EXCITED COPPER
TARGET
EMISSION INTENSITY 0 TO 4 X 10$^4$
COUNTS/MIN. 10$^{-3}$ TORR

FIG. 31B

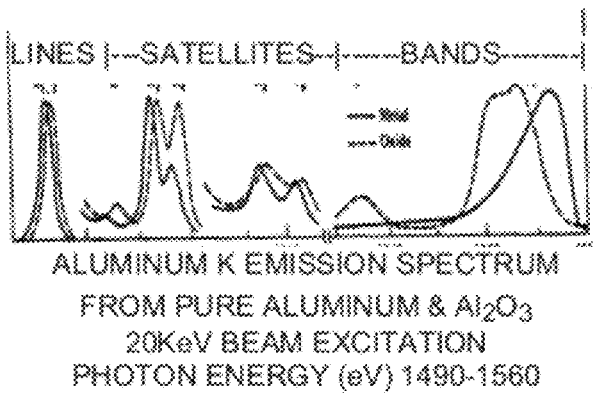

ALUMINUM K EMISSION SPECTRUM
FROM PURE ALUMINUM & Al$_2$O$_3$
20KeV BEAM EXCITATION
PHOTON ENERGY (eV) 1490-1560

FIG. 31C

TARGET METAL: CHARACTERISTIC X-RAY SPECTRUM OF TARGETS
FIG. 31

3200
| SECONDARY ELECTRON EMISSION | | | |
|---|---|---|---|
| ELEMENT | d MAX | E d max (keV) | E II (keV) |
| Cu | 1.30 | 0.60 | 1.5 |
| Al | 1.00 | 0.30 | 0.3 |
| C (graphite) | 1.00 | 0.30 | 0.3 |
| C (soot) | 0.45 | 0.50 | |
| Cd | 1.10 | 0.45 | 0.7 |
| K | 0.70 | 0.20 | |
| Li | 0.50 | 0.09 | |
| Ma | 0.95 | 0.30 | |
| Si | 1.10 | 0.25 | 0.5 |
| Ti | 0.90 | 0.28 | |
| W | 1.40 | 0.65 | >1.5 |
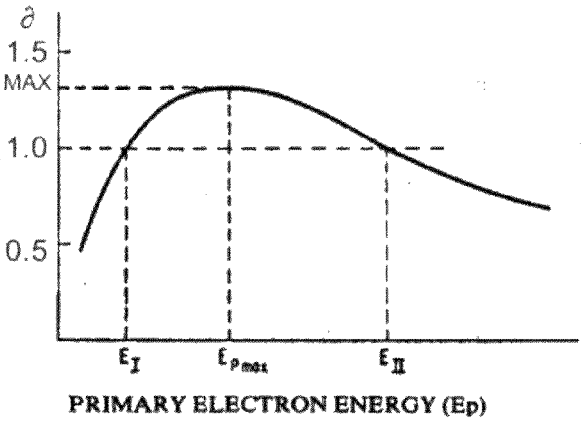
TARGET METAL: SECONDARY ELECTRONS FIG. 32A
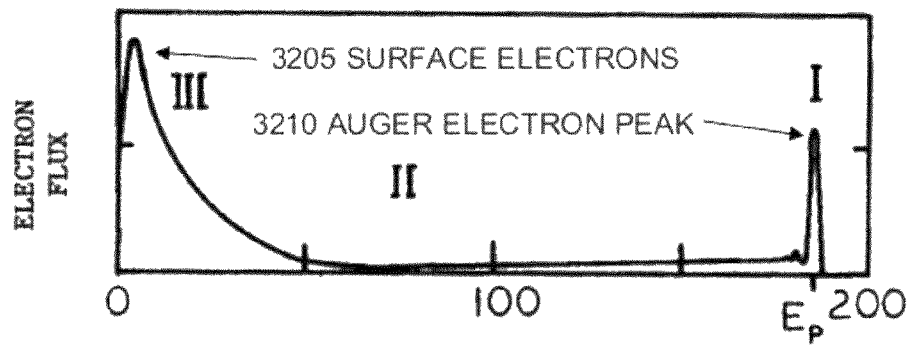
SECONDARY ELECTRON ENERGY (eV)
ENERGY DISTRIBUTION FOR ELECTRONS EMERGING FROM ELECTRON BOMBARDMENT
TARGET METAL: AUGER ELECTRONS FIG. 32B
TARGET METAL
FIG. 32

ISOTOPE SUMMARY TABLE FIG. 33A

| Element | AMU | Half Life (Y,D) | Peak Beta Kin. En'gy (keV) | Opt. Beta Coll-ect'n Voltage (kV) | Specific Power at time zero mW/gm | Conv'n Efficiency | Conv'n Specific Power (time zero) | Conversion Specific Power (182 Days) | Conversion Specific Power (365 Days) |
|---|---|---|---|---|---|---|---|---|---|
| Sn | 123 | 129 D | 1403 | 350 | 27127 | 0.02625 | 712.1 | 465.67434 | 303.82260 |
| H | 3 | 12.3 Y | 18.6 | 4.7 | 336 | 0.02625 | 8.8 | 8.71302 | 8.60676 |
| P | 32 | 14.3 D | 1709 | 427 | 1170000 | 0.02625 | 30712.5 | 665.89644 | 14.13695 |
| P | 33 | 25.3 D | 249 | 62 | 70800 | 0.02625 | 1858.5 | 213.15354 | 24.15767 |
| S | 35 | 87.2 D | 167 | 42 | 12340 | 0.02625 | 323.9 | 172.81393 | 91.87847 |
| Ni | 63 | 101 Y | 66.9 | 17 | 5.8 | 0.02625 | 0.2 | 0.15202 | 0.15180 |
| Si | 32 | 150 Y | 221 | 55.3 | 29.1 | 0.02625 | 0.8 | 0.76311 | 0.76234 |
| Ca | 45 | 162.7 D | 258 | 65 | 8150 | 0.02625 | 213.9 | 152.77172 | 108.89187 |

| Element | Atomic Mass (AMU) | Half Life (Y,D) | PK. Beta Kinetic Energy (keV) | Opt. Beta Coll. Volt. (kV) | Specific Power (mW/gm) | Usable Specific Power (mW/gm) |
|---|---|---|---|---|---|---|
| H | 3 | 12.3 Y | 18.6 | 4.7 | 113 | 15.9 |
| P | 32 | 14.3 D | 1709 | 427 | 305000 | 42822.0 |
| P | 33 | 25.3 D | 249 | 62 | 24400 | 3425.8 |
| S | 35 | 87.2 D | 167 | 42 | 4470 | 627.6 |
| Ni | 63 | 101 Y | 66.9 | 17 | 2.4 | 0.3 |
| Si | 32 | 150 Y | 221 | 55.3 | 10.3 | 1.4 |
| Ca | 45 | 162.7 D | 258 | 65 | 2880 | 404.4 |

ISOTOPE SUMMARY TABLE FIG. 33B

FIG. 33

3400
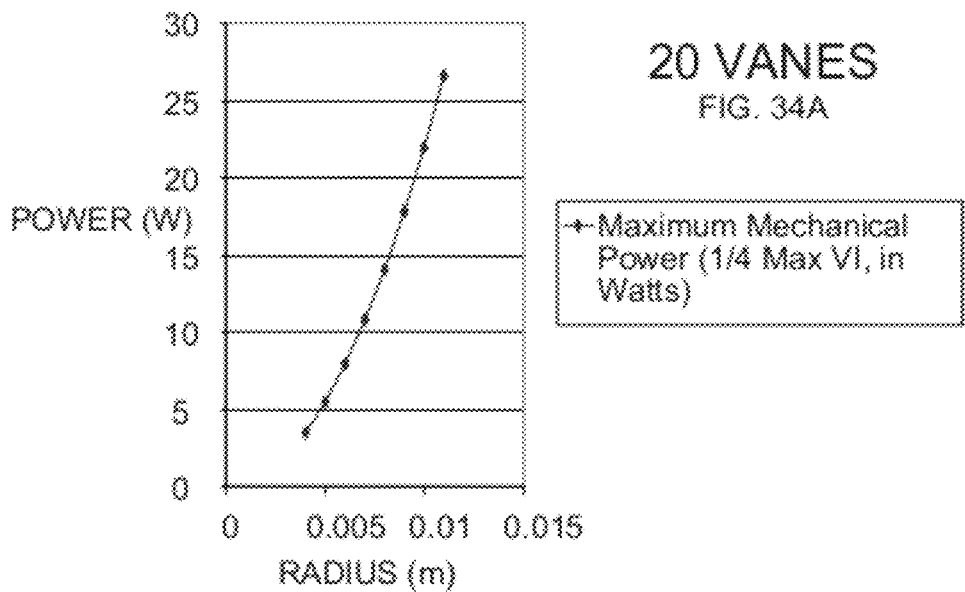
20 VANES
FIG. 34A
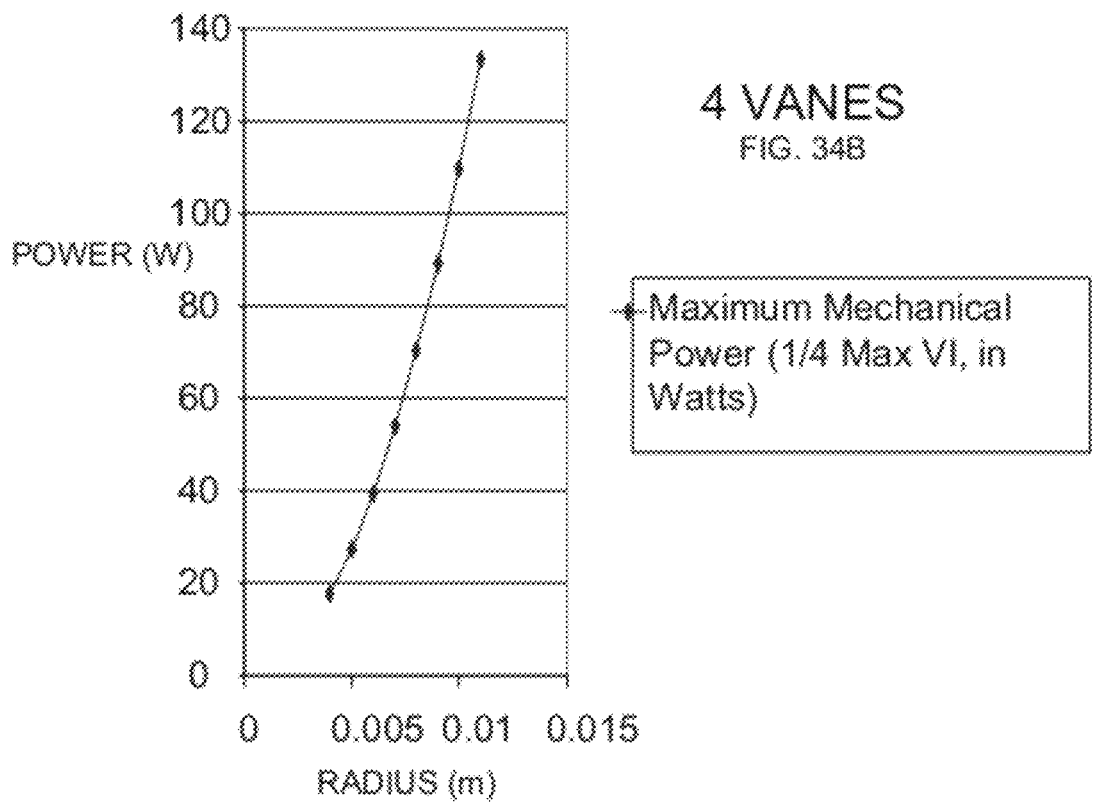
4 VANES
FIG. 34B
P32 ROTARY ACTUATOR POWER
FIG. 34

ISOTOPE ENERGY P/M VERSUS N VANES

FLOW CHART

RADIOISOTOPE FUELED ROTARY ACTUATOR FOR MICRO AND NANO VEHICLES

STATEMENT OF GOVERNMENT INTEREST

The present invention was made under Contract No. W911QX-04-C-0097, mod. no. P00001, awarded by the Defense Advanced Research Projects Agency and the United States Government has certain rights in this invention.

FIELD OF THE INVENTION

The invention relates to an electrostatic actuator apparatus and method, and more particularly, to a beta emission process of a source material emitting electrons which are then captured by a target material wherein electrical work is performed which in turn is transferred into mechanical work in the form of rotation of a rotor. Specific applications include a radioisotope fueled rotary actuator for micro and nano air vehicles employed as the main form of propulsion.

BACKGROUND OF THE INVENTION

A nano air vehicle (NAV) is commonly defined as an air vehicle with a maximum dimension of 7.5 centimeters in any axis, weighing 10 grams or less, and capable of at least 20 minutes endurance and 1-kilometer range.

At this scale, the aerodynamics and power are significant challenges. Multiple tradeoffs are involved. One approach to the challenges is to use lithium polymer batteries as part of the airframe. However, these tend to change size as they are used, impacting structure integrity. Another challenge is motor integration. Conventional fossil or battery powered motors are driven through gear mechanisms to turn a propeller or turbine. These designs impose severe range penalties, have a high specific mass fraction of total air vehicle, and endurance limitations which impact the overall ability to perform specific missions.

Propulsion of micro air vehicle (MAV) and NAV aircraft is traditionally affected through a conventional motor. The problem is that a motor, either electrical (usually DC) or fossil fueled, occupies a rather large portion of the vehicle mass fraction. Furthermore, as the MAV/NAV vehicle becomes more structurally efficient, the percentage devoted to propulsion utilizing conventional technologies increases further, implying an even harsher penalty in terms of payload due to propulsion requirements. Another significant drawback to conventional propulsion technology is implicit in the range capability of the vehicles. As the vehicles shrink in size, the ability to carry fuel, either electrical or fossil based, enforces strict limits on overall endurance. Thus, a vehicle which is capable of flight at just 30 knots is typically only capable of ranges 7-10 nautical miles. While this may be suitable for some applications, under true operational constraints, a significant increase in range is required in order to make the technology truly valuable to the user community.

Endurance is another area requiring improvement for MAV/NAV devices. Present technological limits are in the 30 minute range as evident by the AeroVironment® Black Widow design, typical of high performance MAV's. The flight duration under optimal conditions significantly limits utility to the operator. AeroVironment is a registered trademark of the AeroVironment Inc. Corporation of California.

Radioisotope power systems (RPS) are employed in spacecraft. Radioisotope thermoelectric generators (RTGs) have been used to power, for example, pacemakers and spacecraft, but are complex, requiring the source material, a walled container, thermocouples, and a heat sink to generate electricity. Nor is the energy produced by these compatible with the mass and volume constraints of MAV/NAVs.

What is needed, therefore, are techniques for an actuator for micro-scale vehicles that is efficient in power conversion, providing sufficient power to generate lift and thrust at this small scale of flight.

SUMMARY OF THE INVENTION

Embodiments significantly reduce the mass fraction devoted to air vehicle propulsion and increase range and operation time for MAV/NAV vehicles. Volumetric and electrical efficiencies are maximized to obtain an operational duration of 1 year for a propeller driven MAV design. The propulsion technique is directly applicable to all other types of micro and nano scale vehicles including ground and water conveyances, including submersibles. Embodiment applications encompass new robotic devices including home products.

Through the use of radioisotopes as the fuel and designing the rotary actuator to take advantage of the intrinsically high operating voltage and resulting high rotational frequency, direct drive is possible in embodiments. This eliminates the need for gearing and ancillary fuel storage containers. Therefore, the mass fraction devoted to propulsion for the vehicle can be significantly altered such that an increase in payload is permissible. This increases the utility of the overall vehicle concept. Furthermore, by using a radioisotope material with a sufficiently long half life, the endurance and therefore the range can be significantly improved allowing the vehicle to fly great distances and loiter over the mission area for weeks to potentially months before returning to the home base. This is a more extensive hover and stare capability than currently available. For embodiments, the radioisotope provides not only propulsive power but electrical power.

Embodiments of the present invention utilize a rotary actuator as a means of driving a conventional propeller for propulsion of the MAV/NAV. The use of a radioisotope powers an EA at the MAV/NAV scale at the power density level of $\geq 100$ mW/gm. Embodiments are scalable over a range of absolute powers and corresponding sizes. Furthermore, by using a radioisotope to drive the actuator two significant improvements are enabled which dramatically change the MAV/NAV paradigm. The first is a reduction in overall mass fraction of the air vehicle devoted to propulsion and the second is virtually unlimited range and endurance on the order of three months to a year in embodiments. Furthermore, this technology is not limited to conventional air vehicle designs. The rotary actuator, through a cam and follower motion transmission design, can also drive unconventional flapping wing designs such as an ornithopter. Embodiments can also mimic the biomechanics of insect type devices to effect flight in a manner analogous to dragonflies and hummingbirds.

As mentioned, additional applications include propulsion for micro-submersible vehicles wherein the radioisotope provides not only propulsive power but electrical power to the vehicle. By virtue of elimination of combustion, virtually unlimited range is available. Applications would not suffer from radiation emission safety hazards and so could avail themselves of more energetic sources. Other applications are NASA projects involving miniature robotic payloads which are keenly attuned to the needs for extremely low weight (during launch) and the desire for extremely long operation which is not necessarily afforded through conventional battery technology and solar charging circuits. Additional space applications include robotic devices which "fly" in an unconventional sense over a planetary surface and thus require both propulsion and extremely low weight.

One embodiment provides a rotary electrostatic actuator (EA) apparatus comprising a high voltage source; a target material receiving voltage from the high voltage source; wherein a source vane is attracted to the target material as a result of charges attracted to higher E fields. Another embodiment comprises a radioisotope emission high voltage source. Further embodiments provide at least one of piezoelectric crystals and Van de Graff generator. Yet other embodiments comprise S35; P32; P33; Ca45; and Sn123. In yet further embodiments, the actuator is a disk rotor; a vertical wall rotor; and a stacked rotor. Some embodiments comprise a replaceable source. An embodiment implements partial discharge. Another embodiment comprises a storage capacitor re-charging the target.

Another embodiment is an electrostatic rotary actuator method comprising providing emission from a source; capturing the emission by a target material; generating rotation from electrostatic force; and discharging developed potential. In another embodiment, the source is a radioisotope providing the emission. For other embodiments, the step of discharging comprises partial discharge. Additional embodiments provide a low atomic number beta emitter source. In a yet further embodiment, the radioisotope source further provides electrical power.

Embodiments include a radioisotope fueled electrostatic disk rotary actuator nano air vehicle apparatus comprising two pairs of chutes comprised of metal, wherein the two pairs of chutes comprise a surface film of a light metallic element; a rotating vane disk, between the two pairs of chutes and coaxial with the two pairs of chutes, the rotating vane disk comprising twenty four source vanes comprising beta-emitting radioisotope comprising at least one of S35 and Ca45, wherein the radioisotope comprises a source film with a thickness of about approximately one half penetration depth, whereby current is a maximum; a housing comprising a lead-plated vacuum envelope, enclosing the two pairs of chutes and the rotating vane disk, whereby emission products of the radioisotope are contained, the vacuum envelope is sputtered deposition plated with a lead layer of about approximately one micron, whereby surrounding area is protected from soft X-rays, and beta upset of localized electronics is prevented; and wherein rotation of the rotary actuator is magnetically coupled directly to a propeller component, thereby eliminating losses due to a mechanical gear box, whereby propulsion is provided to the nano air vehicle.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 1 depicts four rotary actuator embodiments configured in accordance with embodiments of the present invention.

FIG. 2 depicts an additional four rotary actuator embodiments configured in accordance with embodiments of the present invention.

FIG. 6 depicts views of rotary embodiment six configured in accordance with the present invention.

FIG. 7 depicts top views of rotary embodiment five and vertical wall rotor embodiment configured in accordance with the present invention.

FIG. 8 depicts capacitance versus rotation diagrams configured in accordance with one embodiment of the present invention.

FIG. 9 depicts finite element model (FEM) for rotary embodiment one configured in accordance with the present invention.

FIG. 11 depicts capacitance vs. rotation for a rotary motor configured in accordance with one embodiment of the present invention.

FIG. 12 depicts radioisotope energy analysis diagrams configured in accordance with the present invention.

FIG. 15 depicts partial discharge with low current analysis figures configured in accordance with one embodiment of the present invention.

FIG. 17 depicts Sn123 partial discharge with low current configured in accordance with one embodiment of the present invention.

FIG. 23 depicts capacitance vs. rotation, partial discharge, for a large gap, all vanes present configured in accordance with one embodiment of the present invention.

FIG. 26 depicts a table of ionization and ranges of alpha and beta particles.

FIG. 27 depicts graphs illustrating specific power of beta and gamma emission sources for actuators.

FIG. 30 depicts energy graphs configured in accordance with one embodiment of the present invention.

FIG. 31 depicts a table and graphs of target radiation characteristics.

FIG. 32 depicts a further table and graphs of target radiation characteristics.

FIG. 33 depicts isotope summary tables.

FIG. 34 depicts graphs of P32 rotary actuator power configured in accordance with embodiments of the present invention.

DETAILED DESCRIPTION

Overview

Figure 3:
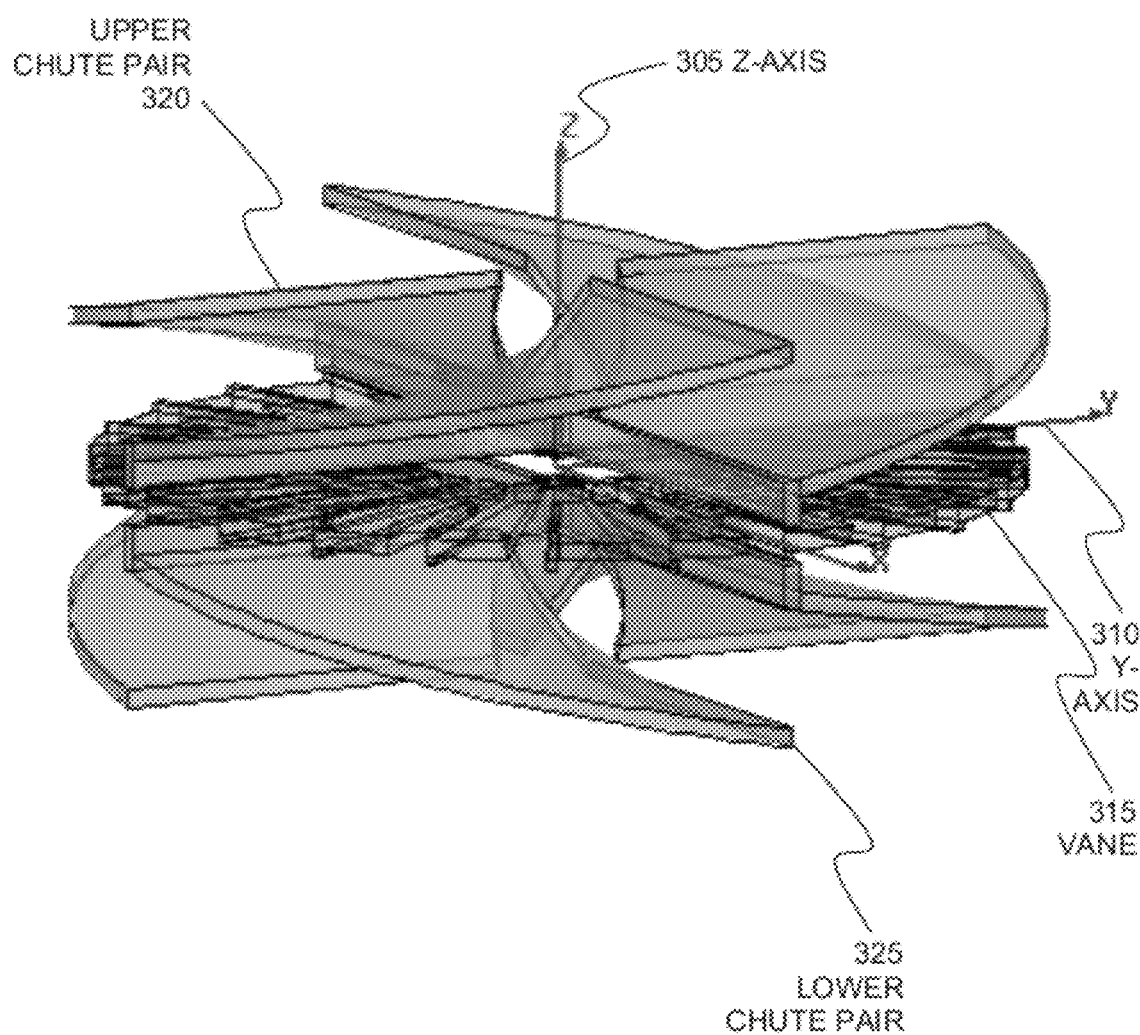
FIG. 3 is a perspective view of disk rotary embodiment one configured in accordance with the present invention.

An actuator's source vanes rotate within an electric field between chutes' walls, generating torque. The principal which allows torque and power is the change in energy as a vane gets closer to the outer walls. The general equation is Torque=d(Energy)/d(theta)=d(½ C V^2)/d(theta). Hence, the vane is attracted toward the narrow sections of the "chutes". The energy is proportional to the volume of the actuator, so large actuators will have more power and torque. Also, energy is proportional to the E field squared, hence, in embodiments, the E field is held close to the breakdown E field. The power is torque *frequency, so faster charging times and greater rotor RPM generate more power, provided that the electrical current can charge the plates at the higher frequency.

Rotor actuator embodiments provide an electrical-to-mechanical power conversion, and the upper limit of the mechanical power is a fraction of the electrical power, which is Voltage*Current. The larger the current, the more power is generated. For radioisotopes, this means a larger source disk will generate more power. Also, for minimum size, in embodiments, the gap dimension is slightly larger than the threshold distance necessary to prohibit breakdown.

The rotor can be scaled in size for more power. Due to electrostatic breakdown (arcing/lightning), the gap between the vane and the chute of the rotor will scale as the voltage is increased, and the E field will be a constant. For example, in embodiments, the peak E field is at a value just below the threshold for arcing. As stated, the power of the actuator scales as E field squared, so it is beneficial to maintain high E fields.

A rotary actuator can have reasonably arbitrary spin RPM, unlimited by mechanical resonant frequencies, and hence can generate power just limited by the ability of the current to charge the plates.

The rotor can be charged by anything that generates high voltage. Examples are piezoelectric crystals or Van-de-Graff generators. It is not required that radioisotopes, embedded into the spinning disk, be the energy source. The charging source can be separate from the actuator.

For embodiments, the number of source "wedges" is much larger than the number of chutes, so that, as one wedge is getting discharged at the throat (end) of the chute, the torque is not disturbed for the next wedge. The wedge getting discharged is effectively at the chute voltage, and hence the next wedge will be attracted to this discharged wedge, which will not generate torque, because the discharged wedge is on the same disk. For this reason, in embodiments, there is a throat section at the end of each chute, which fully encapsulates the wedge getting discharged. Hence, the next-in-line wedge always is closer to the chute walls during the discharge process, and not closer to the discharging wedge.

Partial discharge can be used as a technique to keep the same power level at arbitrary RPM. With full discharge, the RPM is limited by the time is takes to re-charge the vanes. With partial discharge, smaller currents are not required to waste time and energy charging up the vane/capacitor to close to peak voltage. Almost all the torque is generated when the capacitance is near fully charged, due to the E^2 dependence of the torque. Partial discharge can be implemented as a long RC time constant, when the spinning "wedge" of the disk is shorted at the end of the chutes. It can also be implemented as a separate storage capacitor, which quickly re-charges the chute.

Disk rotor embodiments with a flat spinning disk, have the advantage that they are mechanically robust. The flat spinning disk does not experience twist. However, the charge closer to the inner radius is not as effectively generating torque as the charge on the outer radius of the disk. The charge on the inner radius of the disk is also more susceptible to arcing. Vertical wall embodiments have the advantage of more torque, due to all the force being exerted at the farthest radius of the rotor. They are less susceptible to arcing, because the vertical surface of the rotor sees the same large dimensions. They also have the advantage that the outer vertical walls of the disk can be tall and have more surface area and hence more torque. However, mechanically, they are a more 3-dimensional structure that needs to be more rigid due to the strain on the outer walls of the spinning disk.

Using radioisotopes, a vacuum is employed in embodiments to allow the electrons or alpha particles to cross the gap between the spinning disk and the chutes. Without a vacuum, electrons ionize the intervening gas, not charging the capacitance. As shown by the standard "Paschen Curve", the pressure, for millimeter size gaps or larger, is much less than ¹⁄₁₀₀₀th of an atmosphere. Pressures above ¹⁄₁₀₀₀ atmosphere stop charge carriers. Pressures near ¹⁄₁₀₀₀ atmosphere cause cascading ionization (lightning). This vacuum constraint is not necessary, for example, if embedded radioisotopes are not used to charge the vanes, and instead an external source is used.

Using radioisotopes, about one third of the charge carriers make it across the gap and charge the plates. Since radioisotopes emit charged particles in random directions, only one third have enough energy in the gap direction to bridge the high voltage across the gap, contributing to efficiency considerations.

Electrostatic actuator design particulars follow. Beta emission characteristics are explained as power modes. For example, operation life is highly dependent upon isotope selection. Embodiments provide weeks to months of useful life. Some embodiments may significantly extend this parameter. Rechargeable designs are included. For embodiments where only beta emission is employed, candidate isotopes are considered. X-ray emission can be a concern for some embodiments. However, judicious choice of materials can limit this to manageable levels. Aluminum structure, for example, generates softer X-ray spectrum than copper. Shielding is possible without significant impact to power density for "light" materials. For embodiments, the beta emitter has the lowest atomic number with acceptable half life which decays into stable elements, or maintains beta decay throughout the process. For some embodiments, this eliminates materials such as Ru106 which decays into gamma emitter. For embodiments, Sn123 is a gamma emitter which meets operational life and power density requirements. Embodiments demonstrate size, power density, frequency, absolute power, and stroke to support NAV size scale applications.

Figure Details

FIG. 1 depicts four rotary actuator embodiments 100 configured in accordance with the present invention. The rotary motor actuator design operates at a lower voltage than a parallel plate approach; however, embodiments require a vacuum envelope. In addition, embodiments employ either a bearing or very low friction bushing to benefit from the high rotational velocities. High rotational frequencies and variable rates support MAV/NAV operation. Actuator embodiments are sized over a power (VI) range of $0.005 <= P <= 3.8$ W. Embodiments are scalable over a large range of powers/size.

TABLE 1

| Case | E field max (V/m) | Volt. Max (kV) | VI power (W) | Mech. Power (W) | Mech Power/Mass mW/gm | Largest Gap (mm) | Smallest Gap (mm) |
|---|---|---|---|---|---|---|---|
| 1) Stepped Parallel Plate | 5.50E+07 | 110 | 0.140 | 0.016 | 38.0 | 4.0 | 2.0 |
| 2) 1 vane, 1 spiral | 5.50E+07 | 16 | 0.005 | 0.002 | 5.4 | 4.0 | 0.2 |
| 3) 24 vane, 1 spiral | 5.50E+07 | 40 | 0.150 | 0.080 | 188.0 | 4.0 | 0.4 |
| 4) 24 vane, 4 spiral | 1.00E+08 | 84 | 3.800 | 0.870 | 2046.0 | 2.0 | 0.4 |
| 4) 24 vane, 4 spiral | 5.50E+07 | 42 | 1.100 | 0.254 | 598.0 | 2.0 | 0.4 |

The embodiments depicted in FIG. 1 (first through fourth rotor embodiments in FIGS. 1A-1D, respectively) and the table above have mechanical powers calculated for two different E fields: 5.5e7 and 1.0e8 V/m (the second E field is double the first E field, and the voltage is doubled as well). In embodiments, the Power is four times larger when the voltage is doubled, for any of these actuators, because Power $\sim V^2$. The two E fields were selected assuming that one of these would be an upper bound below which arcing occurs.

Embodiment case 4 (FIG. 1, FIG. 1A disk rotor embodiment one), is a noted case for comparison. It is the rotary actuator using 4 chutes and 24 source wedges. It achieves, at a large E field, a Power/Mass of 2048 mW/gm.

For rotary embodiments, there is a limit to the number of source wedges that can be created around the source disk. The limit is caused by arcing considerations. At the throat of each chute, where each source wedge is individually discharged, there is now a voltage between the discharged source wedge and the neighboring un-discharged source wedge. Hence, there is a large E field, and arcing considerations apply just as between the source wedges and the metal chutes. In embodiments, this gap between source wedges may be free from material so that it is not conductive due to ionization.

An advantage of rotary embodiments is that they can operate at 500 Hz with no mechanical decelerations to overcome. However, a bearing needs to be used in embodiments. For embodiments, this bearing can be contained within a vacuum package, and hence itself not require a vacuum seal.

For embodiment case 1 (FIG. 1, FIG. 1D rotary embodiment four) and case 2 (FIG. 1, FIG. 1C rotary embodiment three), the main torque during a full cycle occurs when the tip of the single source wedge gets close to the throat of the chute. This only occurs once each cycle when only one large source wedge is used. Embodiment case 3 (FIG. 1, FIG. 1B rotary embodiment two) overcomes this situation of case 2 by breaking the large single source wedge into 24 separate smaller source wedges. Now, the main torque is occurring 24 times each cycle.

Case 2 also has another consideration. Torque is proportional to the change in the capacitance between the source wedge and metal chute as a function of angle. By using one large chute, this slope in capacitance is very small over the first 70% of the cycle. Hence, case 4 has 4 chutes to have this large slope region of the chute occur over a larger fraction of the cycle.

Finite element modeling (FEM) produced some results for capacitance v. rotation for 1 cm diameter embodiments. 1) More power is derived from more chutes. But an objective is to allow voltage to be high during the greatest slope of the capacitance. Hence, embodiments can not have too many chutes. More power is achieved with more chutes, to a limit. First, the source wedges need to have enough source film to be able to fully charge each chute as it passing through it. Second the number of chutes should probably be half the number of source wedges, in order for embodiments to optimize the torque on each source wedge.

2) The spiral smooth taper has a larger slope to the capacitance (more torque) compared to steps in a parallel plate design. The spiral chute embodiment has a larger change in the capacitance as a function of angle of the wedge source. The spiral also has less sharp corners to cause arcing.

3) For embodiments, it is better to have a least twice as many source pieces than the number of chutes. This allows a steady torque to be applied, and also allows more total capacitance. One source wedge can be experiencing the most torque near the throat of the chute, and the other source wedge(s) can be in the charging stage. Basically, in embodiments, one does not get double the torque by having double the width of the source wedge, because only the leading edge of the source wedge is experiencing the most torque.

FIG. 2 depicts perspective views of an additional four rotary actuator embodiments 200 configured in accordance with the present invention. They include rotary embodiment five FIG. 2A, stacked rotor embodiment six FIG. 2B, rotary embodiment seven FIG. 2C, and vertical wall rotor embodiment FIG. 2D. Due to the high collection voltage for embodiments of FIGS. 1 and 2 (which is a function of the nuclear emission process); each unit is encased in a vacuum envelope. In embodiments, the vacuum envelope provides a secondary function in that it is plated, using a sputtered deposition process, with an approximately micron thick film of protective material such as lead to prevent accidental contamination of the surrounding area by soft X-rays and prevent beta upset of any localized control electronics.

FIG. 3 is a perspective view 300 of disk rotor embodiment one, FIG. 1A. References include Z-axis 305 and Y-axis 310. Vane 315 is between upper chute pair 320 and lower chute pair 325 and shares Z-axis 305 with them. In embodiments, source material is on both the top and bottom of the source disk, in order to get current flowing in both directions. In alternate embodiments, a thick disk of source material is sandwiched inside a thin walled disk, and beta electrons escape from both sides of the disk. For other embodiments, the source disk is removable to allow for recharging.

Figure 4:
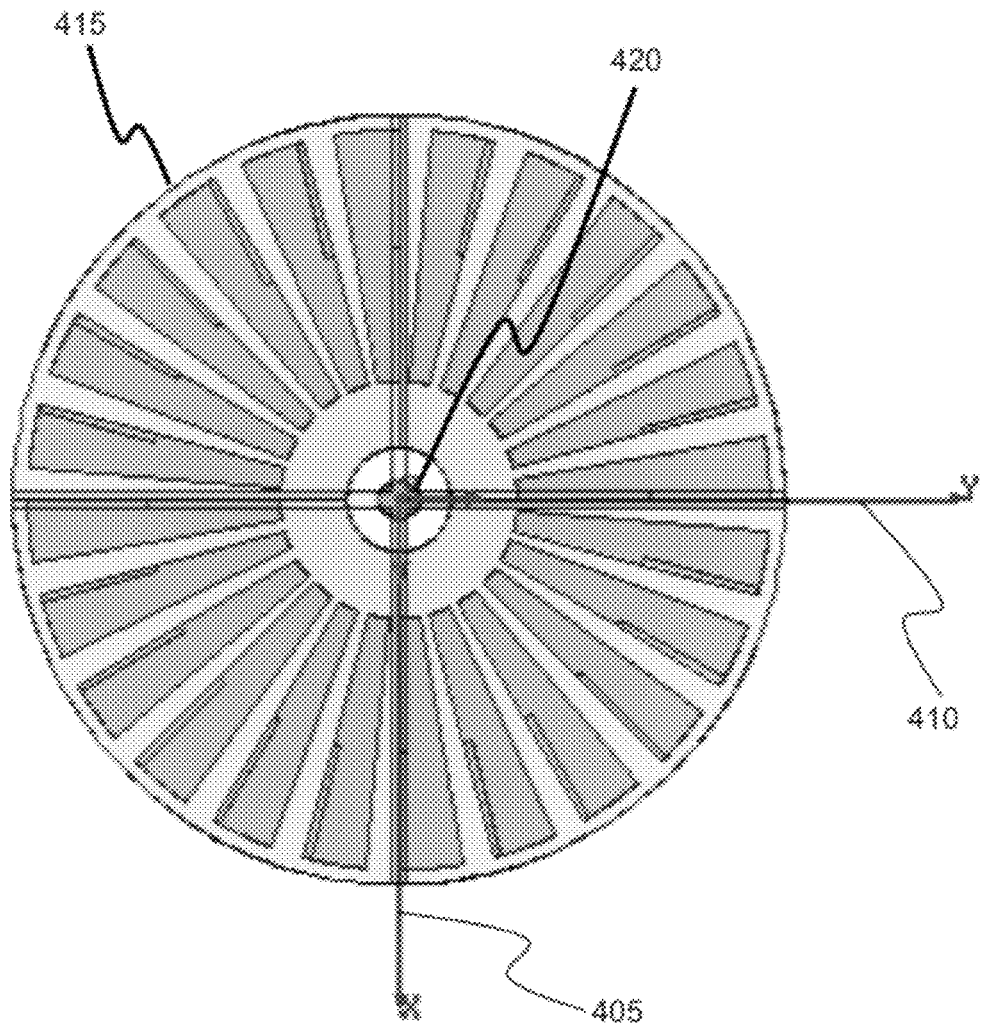
FIG. 4 is a plan top view of vanes of disk rotary embodiment one configured in accordance with the present invention.

FIG. 4 is a plan top view 400 of vanes of disk rotor embodiment one, FIG. 1A. Here, references include X-axis 405 and Y-axis 410. Vane disk 415 has center portion 420.

Figure 5:
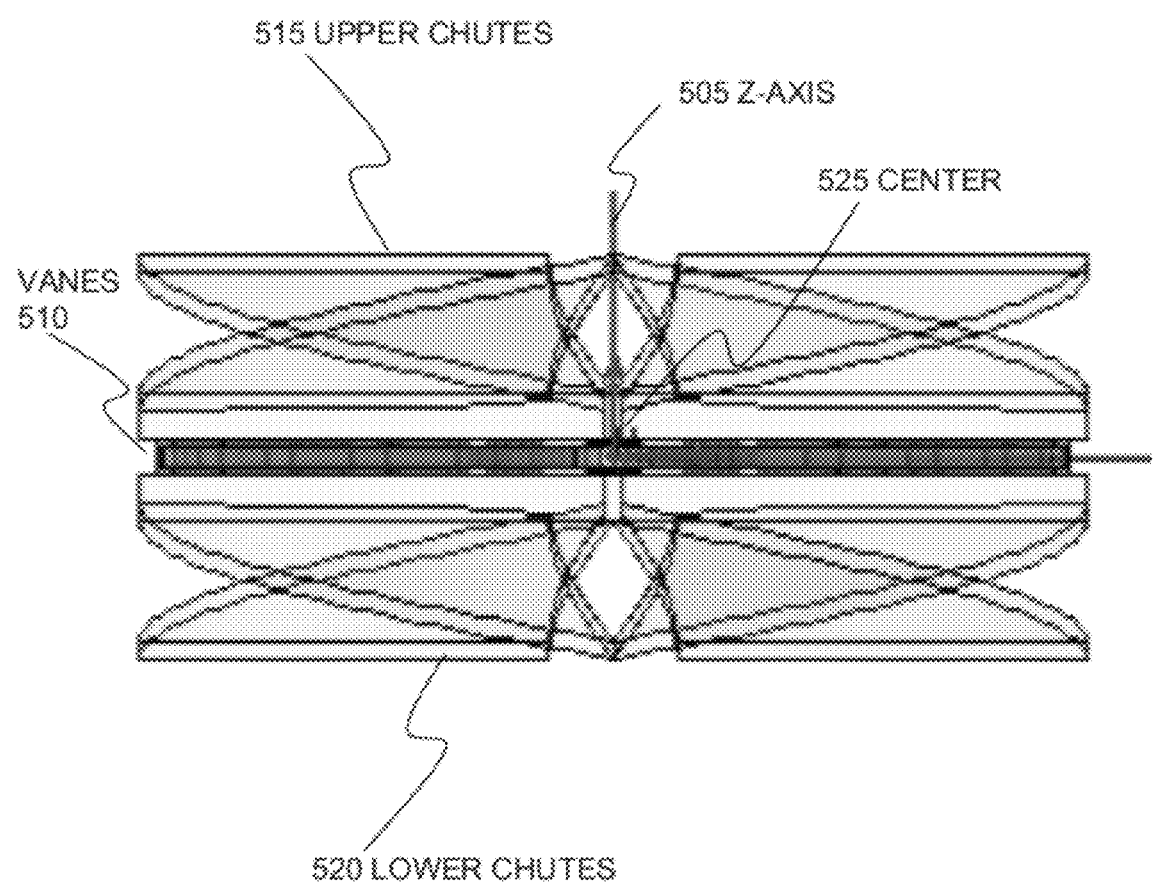
FIG. 5 is a side elevation view of disk rotary embodiment one configured in accordance with the present invention.

FIG. 5 is a side elevation view 500 of disk rotor embodiment one, FIG. 1A. References include Z-axis 505. Vane disk 510 is between upper chute pair 515 and lower chute pair 520 and shares Z-axis 505 with them. Vane disk 510 has center portion 525. For embodiments, the highest gap is 2 mm, there are 24 source vanes, and four metal chutes.

FIG. 6 depicts views 600 of rotary embodiment six configured in accordance with the present invention. FIG. 6A is a side view and FIG. 6B is a top view.

FIG. 7 depicts views 700 of rotary embodiment five and vertical wall rotor embodiment configured in accordance with the present invention. FIG. 7A is a top view of rotary embodiment five of FIG. 2A, and FIG. 7B is a top view of vertical wall rotor embodiment of FIG. 2D.

FIG. 8 depicts capacitance versus rotation relationships diagrams 800 configured in accordance with the present invention. FIG. 8A depicts an angle of −85 degrees, FIG. 8B depicts an angle of 40 degrees, and FIG. 8C depicts an angle of 0 degrees. Relationship equations include:

$$\tau = \frac{1}{2}\frac{dC}{d\theta}V^2 \quad \text{Eq. 1}$$

$$P = \tau\omega \quad \text{Eq. 2}$$

For embodiments, torque and power are optimized by optimizing the slope of C, and allowing the voltage to be large. Just as Force=(½) (dC/dx) V^2, the torque has the same type of formula: Torque=(½) (dC/d(angle)) V^2. Power for linear oscillations is Power=Force*velocity. Power for spinning motion is Power=Torque*(angular velocity).

FIG. 9 depicts finite element model (FEM) 900 of rotary embodiment one (FIG. 1A). The FEM model high-frequency structure simulation (HFSS) is used to calculate the capacitance versus rotation angle of each source vane, including probe port to measure impedance between source plate and target. It is a FEM model for a 1 cm diameter rotary motor embodiment. Variables include a 2 mm highest gap, 24 source vanes, and 4 metal chutes. The finite element model models capacitance between source wedge 905 and the metal chute as a function of angle of the source wedge, and includes probe port to measure impedance between source plate and target chutes 910. The impedance near the origin in the figures was determined, and the capacitance was determined from this impedance, using Capacitance=1/(2 pi freq impedance). A low enough frequency was used in the model such that the wavelength was much larger than the actuator (1 MHz), and the impedance should be purely capacitive. The symmetry plane imposes the condition that all the fields are parallel to this plane. The far walls and ceiling of the large cylinder are declared as a radiation boundary.

Figure 10:
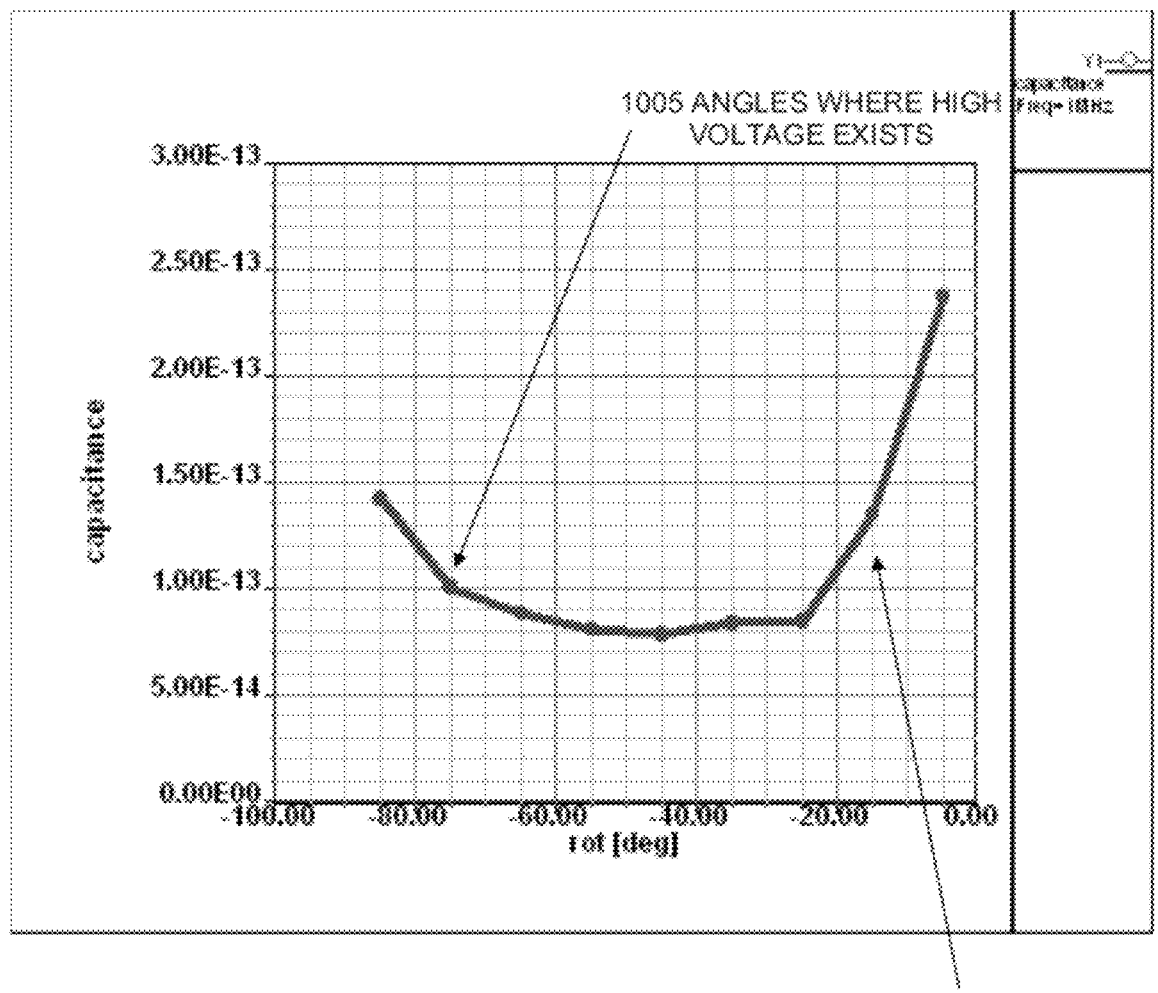
FIG. 10 depicts FEM capacitance predictions for a rotary motor configured in accordance with one embodiment of the present invention.

FIG. 10 depicts FEM capacitance predictions 1000 of rotary embodiment one (FIG. 1A). Again, FEM capacitance predictions are for a 1 cm diameter rotary motor embodiment. The slope of the capacitance versus angle is notably important when the source material is deep inside the chute and the voltage is very large. In the plot, that condition occurs from −60 to −90 degrees 1005. The steeper slope in the capacitance between 0 and −20 degrees 1010 occurs just after the source wedge was stripped of its charge by sliding through a slot. The charge buildup process has started but there is little voltage buildup yet.

FIG. 11 depicts capacitance vs. rotation 1100 of rotary embodiment one (FIG. 1A). Results are for capacitance vs rotation, 1 cm diameter rotary motor embodiment; total power using 24 source vanes at 100 Hz; 0.250 Watts Total Power/Mass=598 mW/gm; Power VI=1.1 Watts; Largest Voltage=44 kV; Largest E field=5.5e7 V/m; current per source vane=2e-6 Amps; Approximately 23% VI to mechanical power conversion. In plot FIG. 11A for the torque versus rotation angle, the torque only becomes prominent during the last ⅓rd of the cycle (from 60 to 90 degrees). This is when the voltage has reached a maximum, and when the slope of the capacitance is large.

In plot FIG. 11B for voltage versus rotation angle, the voltage charges up from 0 to 60 degrees, and peaks between 60 and 90 degrees. The voltage drops from 80 to 90 degrees because the gap in decreasing, but the E field (plot FIG. 11C) is still increasing. In this embodiment example, the E field was limited to 5.5e7 V/m. Nearly four times more power is possible if the E field is allowed to rise to 1e8 V/m.

FIG. 12 depicts radioisotope energy analysis diagram 1200 configured in accordance with one embodiment of the present invention. Included is perspective view FIG. 12A of collector plates and force plates with charge collector plates 1205, force plates (less gap) 1210, and depicting wider tip 1215 to get shorting to target plates only at one instant. In addition to perspective view are side view FIG. 12B and top view FIG. 12C. Analyses were for radioisotopes using energy arguments. This particular embodiment is good for explanation purposes. The following conceptual comparisons between four radioisotopes are based on energy arguments, and not on any one particular geometric shape for the rotary motor. Assume an optimal shape is determined, and assume that ¼ the electrical power is converted into mechanical power. Now compare the different radioisotopes, and the power limits for each.

FEM can be used to optimize the complex capacitance versus rotation angle for embodiments. Maximize the number of chutes as the radioisotope current can charge in the shorter time frame. More radioisotope source wedges than chutes are employed in embodiments, in order to generate smooth torque, and to make full use of the charge time. The power is proportional to the spin rate, as long as the film thickness can be increased to supply the extra needed current. Unlike a linear actuator (without restoring spring), rotary actuator embodiments can spin much faster than 100 Hz without having the electrostatic force compete with the mechanical accelerations. P33 and S35 isotopes are embodiment candidates when a maximum voltage of 50 kV is imposed. If 300 kV can be achieved without breakdown, then P32 is a selection, however P32 embodiments can require much metal to stop the electrons if only 50 kV is used.

Both alpha and gamma emitters were reconsidered. Embodiments achieve at least 50 mW/gm at 1 year life. If operational life were to be restricted to 80 days or less, pure beta emitters are feasible in embodiments. If operational life of 1 year is firm requirement, Sn123 is an available candidate. Note that battery type actuators could provide a potential solution wherein the long life could be achieved through incremental replacement of radioisotope canister. Embodiments may also have manufacturing benefits as well.

Figure 13:
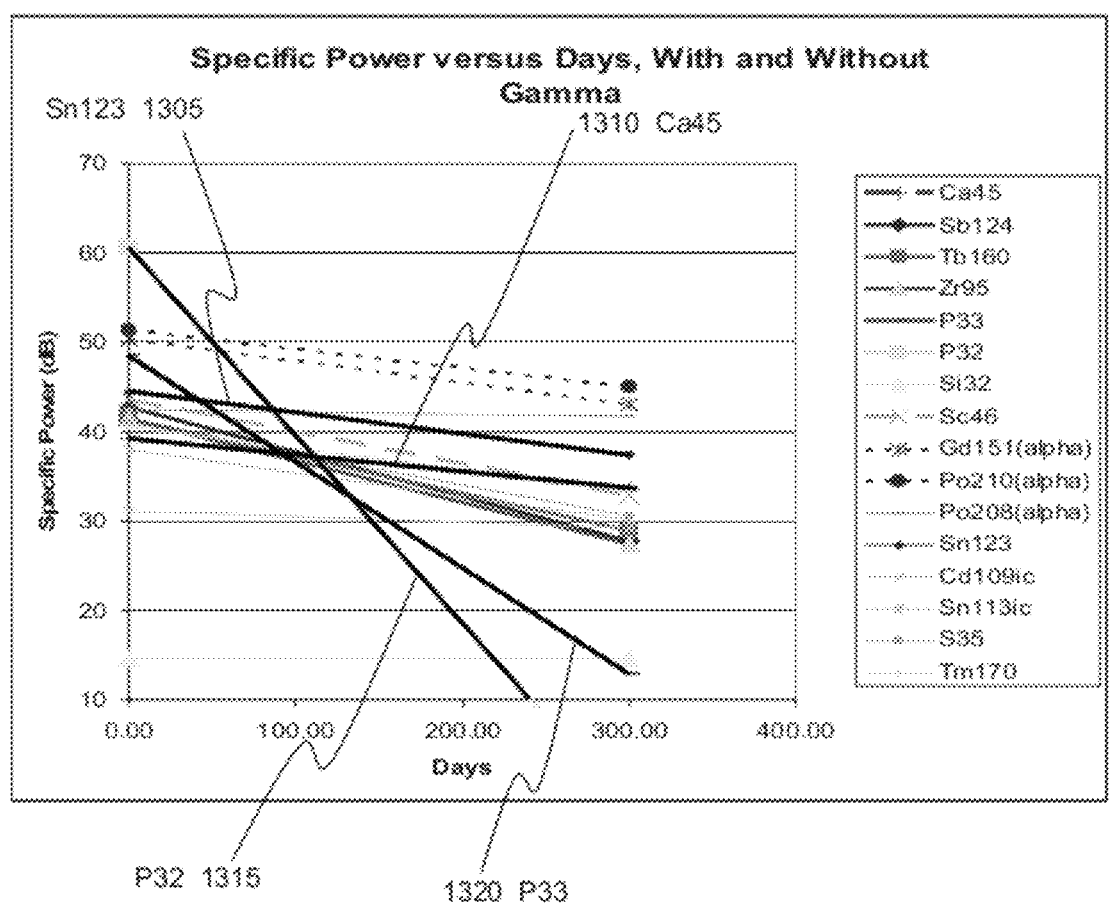
FIG. 13 depicts power decay configured in accordance with the present invention.

FIG. 13 depicts a power decay graph 1300 configured in accordance with the present invention. Identified are Sn123 1305; Ca45 1310; P32 1315; and P33 1320. Power=10*Log 10((Power/Mass) exp(−t/halflife)) If use of the electrostatic actuator (EA) is after 80 days, embodiments can use Sn123 or Ca45. If use of the EA is before 80 days, embodiments can use P33 or P32.

For vertical wall rotor embodiment as in FIGS. 2D and 7B, more torque should be provided for the same source material because the source material is all at a larger radius. For embodiments, there is no advantage to stacking many motors to make double use of the target thickness. Hence, the mass may be double the disk design, when a stacked geometry is used. However, as a stand alone motor, embodiments' power should exceed the source-disk embodiments.

In embodiments, current is small at 6 and 12 months. For embodiments, the current is not large enough to support 375 Hz, and get at least 40 kV. Embodiments can have a stroke approximately 20 mm and get 40 kV, but the plate radius would need to be approximately 100 mm. Typically, embodiments employ a minimum stroke distance which allows maximum E field at the running voltage, but in this case the E field at 100 Hz never gets above 2.5e7 V/m, so embodiments increase stroke to improve voltage. Embodiments increase the full stroke from 3 to 6 mm to recover voltage. At higher frequencies, embodiments employ advanced techniques to keep the voltage high: partial discharge, battery, or storage capacitor. Partial discharge methods of operation are beneficial in embodiments in several ways and can result in an overall increase in actuator net power delivered.

Figure 14:
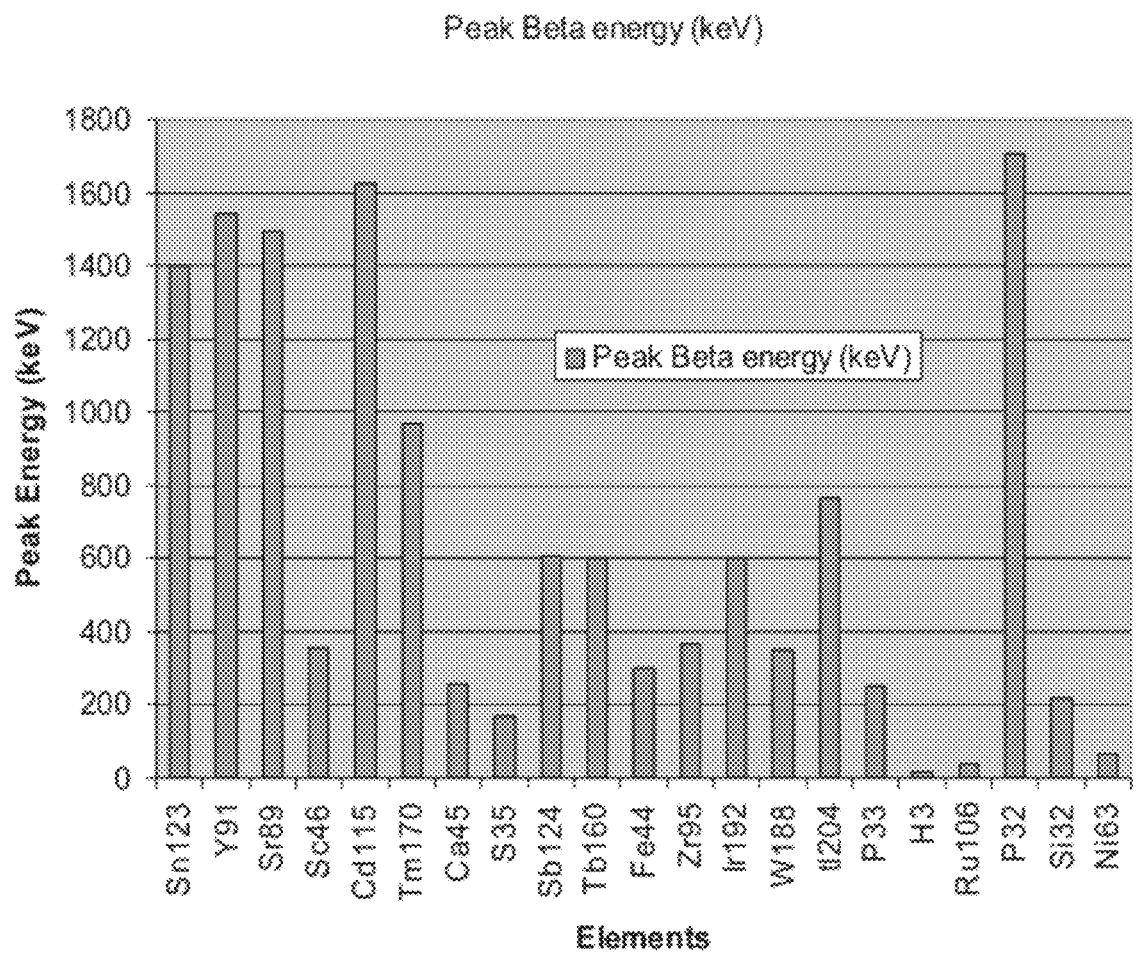
FIG. 14 depicts maximum beta energy of source disk by radioisotope configured in accordance with the present invention.

FIG. 14 depicts maximum beta energy 1400 of source disk by radioisotope in accordance with the present invention.

FIG. 15 depicts a partial discharge embodiment with low current analysis figures 1500 configured in accordance with the present invention. It comprises one chute and four source vanes. Views depict perspective FIG. 15A, side FIG. 15B, and top FIG. 15C. The single motor embodiment uses a 3 cm diameter. This rotary embodiment is optimized for low currents at long timelines. Only one chute is used because the current can only charge one chute per revolution. Four source vanes are used to reduce dead time when a vane is being discharged. This embodiment can use either full or partial discharge. Partial discharge is employed at longer timelines and lower currents if frequencies above 50 Hz are desired. The source vane is attracted into the chute, because charges are attracted to higher E fields. When at the throat of the chute, the source vane can be either fully or partially discharged. In embodiments, the partial discharge mechanism could take the form of an LRC circuit with an appropriate time constant.

Figure 16:
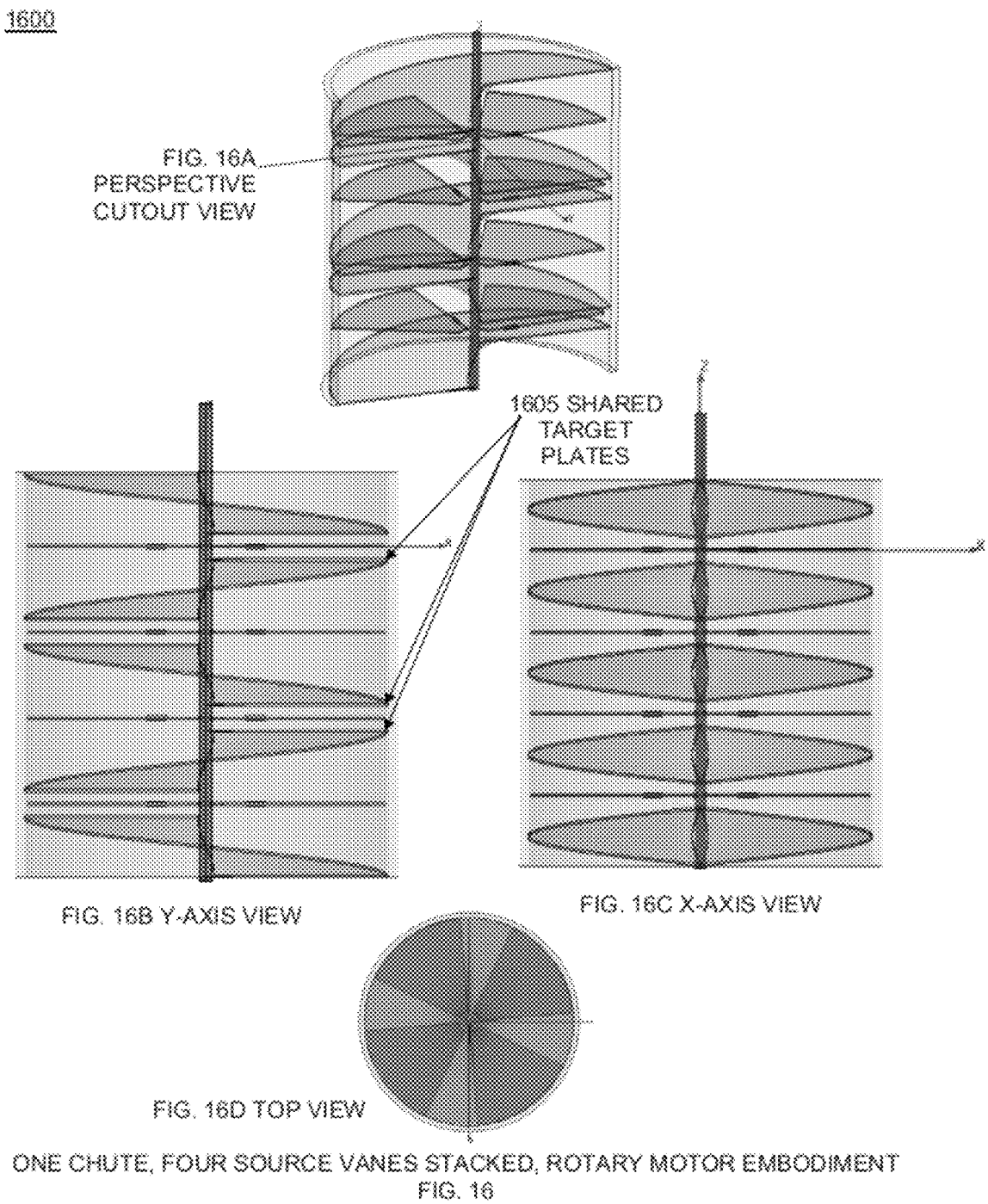
FIG. 16 depicts one chute, four source vanes, stacked rotary motor configured in accordance with one embodiment of the present invention.

FIG. 16 depicts a one chute, four source vanes, stacked rotary motor 1600 configured in accordance with one embodiment of the present invention. Views depict perspective FIG. 16A, y-axis FIG. 16B, x-axis FIG. 16C, and top FIG. 16D with shared target plates 1605. This figure demonstrates how the rotary embodiment can be stacked to increase the power and increase the P/M. Regarding increasing P/M, each metal target plate is doubly used when the motors are stacked on top of each other. Hence, stacking reduces the target metal mass by half (increasing the P/M by up to a factor 2). This advantage is also present for stacked parallel plates. The smooth symmetry of the chutes is conducive to stacking, because both the top and bottom of the target metal can be used as a chute. Regarding increasing the power, the power is proportional to the number of rotary motors.

FIG. 17 depicts Sn123 partial discharge with low current graphs 1700 configured in accordance with one embodiment of the present invention. Curves of FIG. 17A depict P/Ms versus frequency in Hz for 1 year 70nC, 1 year no charge, ½ year 70nC, and ½ year no charge. Curves of FIG. 17B depict P/Ms versus initial charge per vane in nC for 1 year 300 Hz, 1 year 100 Hz, ½ year 300 Hz, and ½ year 100 Hz. Parameters comprise: element=Sn123; Life=1.00 (Yr); Smax=6.0 (mm); 5 min=0.4 (mm); dGap=0.8 (mm); Radius=15.0(mm); Nchute=1.0; Nvane=4.0; Frequency=100.0 (Hz); Emitter Thickness=0.50 (mm); Collector Thickness=0.60 (mm); Structure Thickness=0.40 (mm); Initial Charge=6e-008 (C/vane); Max Voltage =150639.1 (V); Max E field=31.2 (MV/m); Min Current Factor=0.329 (normalized); Power=316.5 (mW); Emitter Mass=1.806 (gm); Collector Mass=3.800 (gm); Structure Mass=1.711 (gm); Total Mass=7.317 (gm); and Specific Power=43.259 (mW/gm). These curves show, for Sn123 embodiments, the advantage of partial discharge when embodiments have low current. For embodiments, when running at very low frequencies, the partial discharge technique is not necessary. The current is allowed to fully charge the EA. In embodiments, if the frequency is too low, the current has too much time to charge the EA and voltage saturation is reached. Hence, no additional power is generated per cycle using extremely low frequencies, and P/M goes to zero as frequency goes to zero. For reference, for Sn123, at 1 year, the potential power output (average decay energy*number decays per kg) is 2100 mW/gm, and at ½ year the potential power output is 5600 mW/gm. Hence, these embodiments get 3.1% efficiency at either of these times. To run at greater than 100 Hz, embodiments use partial discharge (about 10% discharge). Using partial discharge, the P/M is nearly independent of frequency because P/cycle~VdV~VIdt, and P=F*(P/cycle)~(1/dt) *VIdt=VI. Without partial discharge, with V<Vopt, then V~It, so P/cycle~V^2~I^2dt^2. Then P~F*(P/cycle)~(1/dt)* (I^2 dt^2)~I^2/dt. One advantage of using partial discharge is the ability to run at higher frequencies with little penalty. No mechanical conversion loss is generated due to a transmission. For partial discharge, as shown in FIG. 17B, an initial charge of 60 nano Coulombs for this embodiment geometry will optimize the P/M, independent of frequency.

Figure 18:
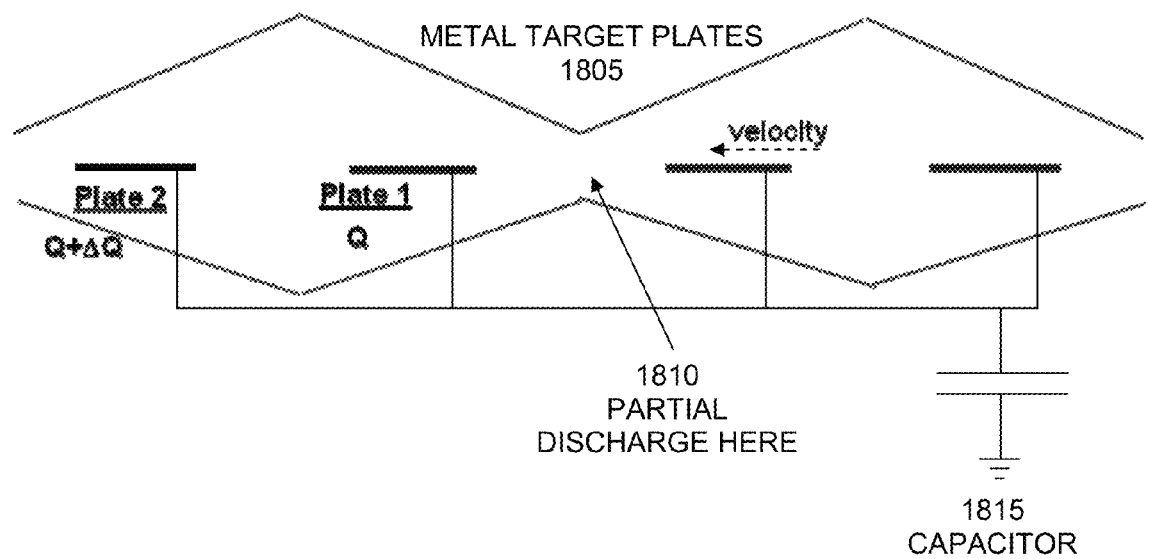
FIG. 18 depicts rotor partial discharge with low current configured in accordance with one embodiment of the present invention.
Figure 19A:
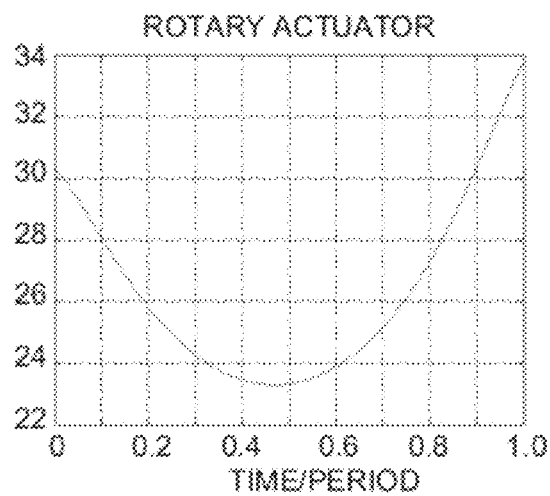
FIG. 19 depicts graphs for rotary actuator, Sn123, ½ year, 375 Hz, partial discharge configured in accordance with one embodiment of the present invention.
Figure 19B:
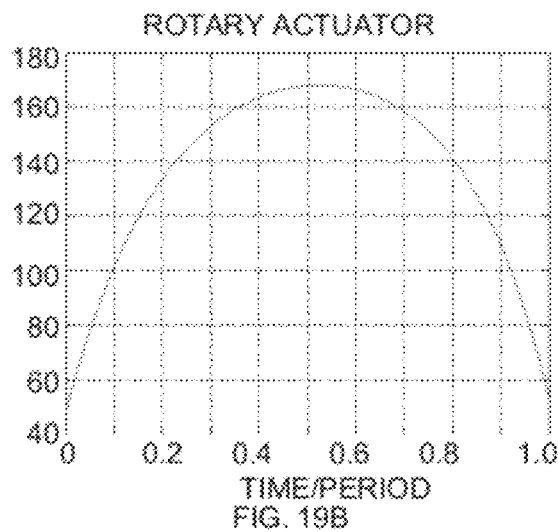
Figure 19C:
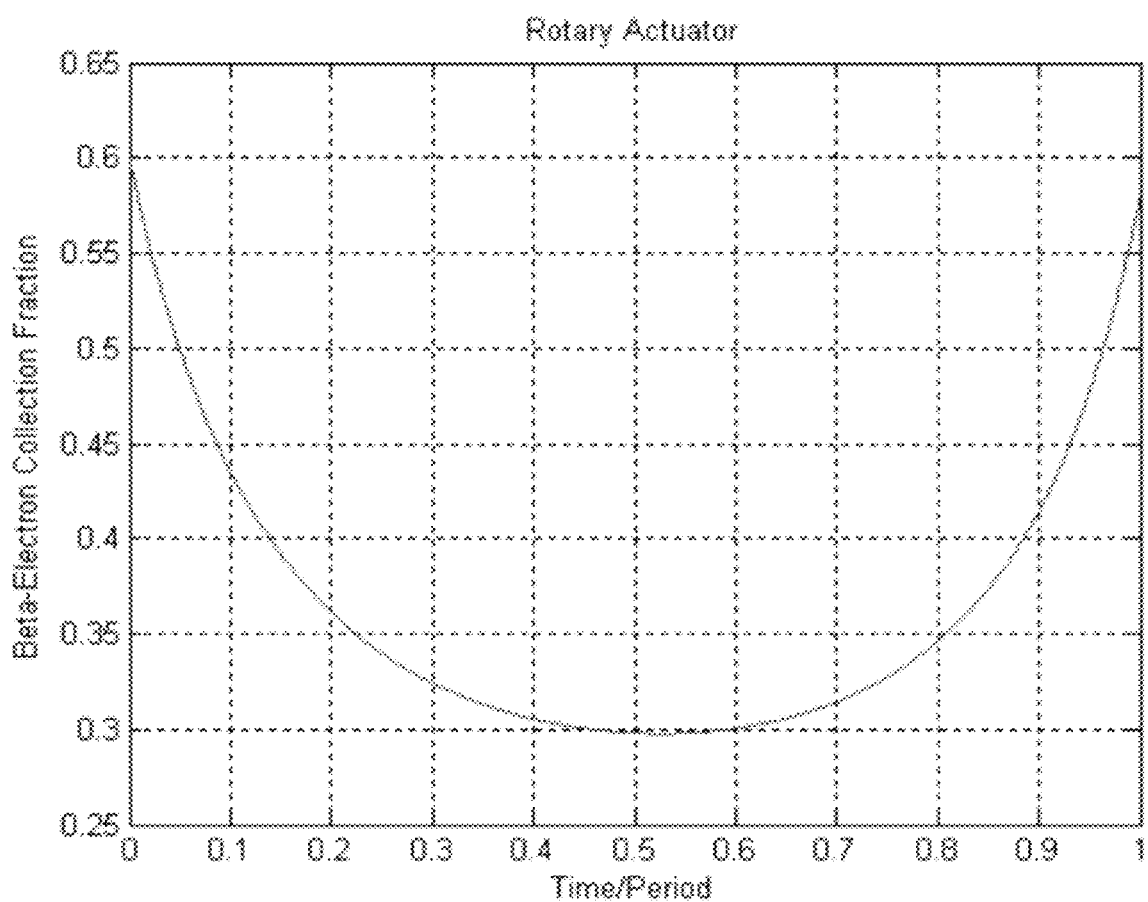
Figure 19D:
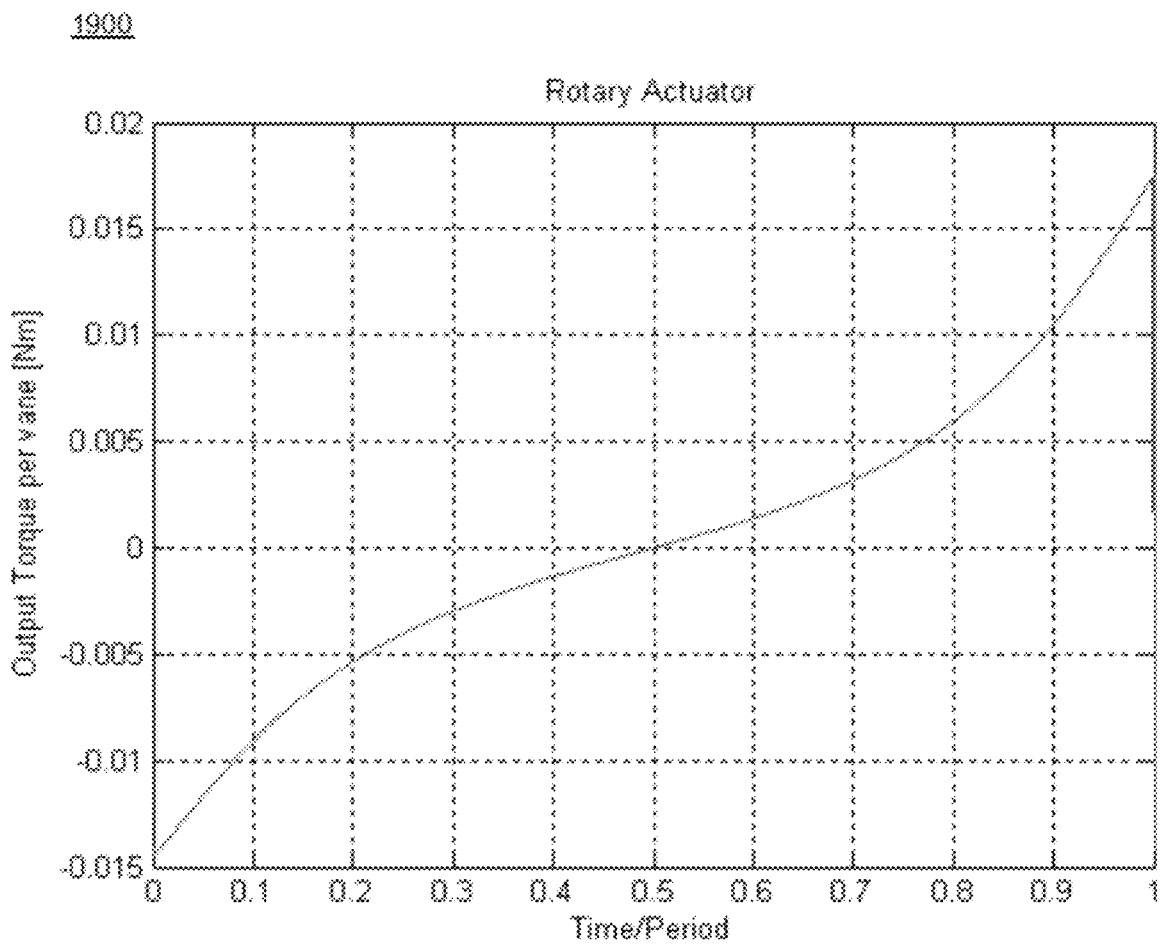

FIG. 18 depicts rotor partial discharge with low current 1800 configured in accordance with one embodiment of the present invention. Rotor embodiments can have an advantage of partial discharge when they have low current as depicted in the figure and below equations.

$$\tau = +\frac{dC}{d\theta}\left(\frac{Q_2}{C}\right)^2 - \frac{dC}{d\theta}\left(\frac{Q_1}{C}\right)^2 = +\frac{dC}{d\theta}\left(\frac{Q_1+\Delta Q}{C}\right)^2 - \frac{dC}{d\theta}\left(\frac{Q_1}{C}\right)^2 \quad \text{Eq. 3}$$

$$\tau = +\frac{dC}{d\theta}\left(\frac{Q_1 \Delta Q}{C}\right) + \frac{dC}{d\theta}\left(\frac{\Delta Q}{C}\right)^2 \approx +\frac{dC}{d\theta}\left(\frac{Q_1 \Delta Q}{C}\right) \quad \text{Eq. 4}$$

FIG. 18 depicts metal target plates 1805 and location of partial discharge 1810. Capacitor 1815 depicts partial discharge target re-charging storage capacitor. The partial discharge term in the equation above is (Q1ΔQ/C). The full discharge term (much less than partial discharge term) is (ΔQ/C)$^2$. This figure explains the advantage of partial discharge, in order to improve P/M. Consider plates 1 and 2. Each is in the same symmetry location inside the symmetric chute, hence each experiences the same magnitude of the slope of the capacitance dC/dth. As the source vane plate 1 moves to the location of source vane plate 2, the charge and voltage is increased 10% to 20%, due to the current. Hence, there is more positive torque at the plate 2 location, compared to the negative torque at the plate 1 location. For partial discharge, the $Q\Delta Q$ term is much larger than the $\Delta Q^2$ term, because $\Delta Q$ is small compared to Q.

FIG. 19 depicts graphs 1900 for rotary actuator, Sn123, ½ year, 375 Hz, partial discharge, configured in accordance with one embodiment of the present invention. Graphs depict an E field slightly larger at end of cycle, which yields net torque in one direction FIG. 19A; voltage which should oscillate around the level of maximum VI product FIG. 19B; current FIG. 19C; and torque slightly larger at end of cycle FIG. 19D. Parameters comprise: element=Sn123; Life=0.50 (Yr); Smax=6.0 (mm); 5 min=0.4 (mm); dGap=0.8 (mm); Radius=15.0 (mm); Nchute=1.0; Nvane=4.0; Frequency=375.0 (Hz); Emitter Thickness=0.50 (mm); Collector Thickness=0.60 (mm); Structure Thickness=0.40 (mm); Initial Charge=7e-008 (C/vane); Max Voltage=168092.2 (V); Max E field=33.8 (MV/m); Min Current Factor=0.298 (normalized); Power=825.2 (mW); Emitter Mass=1.806 (gm); Collector Mass=3.800 (gm); Structure Mass=1.711 (gm); Total Mass=7.317 (gm); and Specific Power=112.783 (mW/gm). Current is limited in the middle of the cycle, at largest gap, when the voltage is highest. The current is strong enough to increase the charge by about 10% during the cycle, above the partial discharge residual charge. The E field is proportional to the charge. The torque increases as the charge squared, and increases by 20% in this example due to the 10% increase in charge.

Figure 20A:
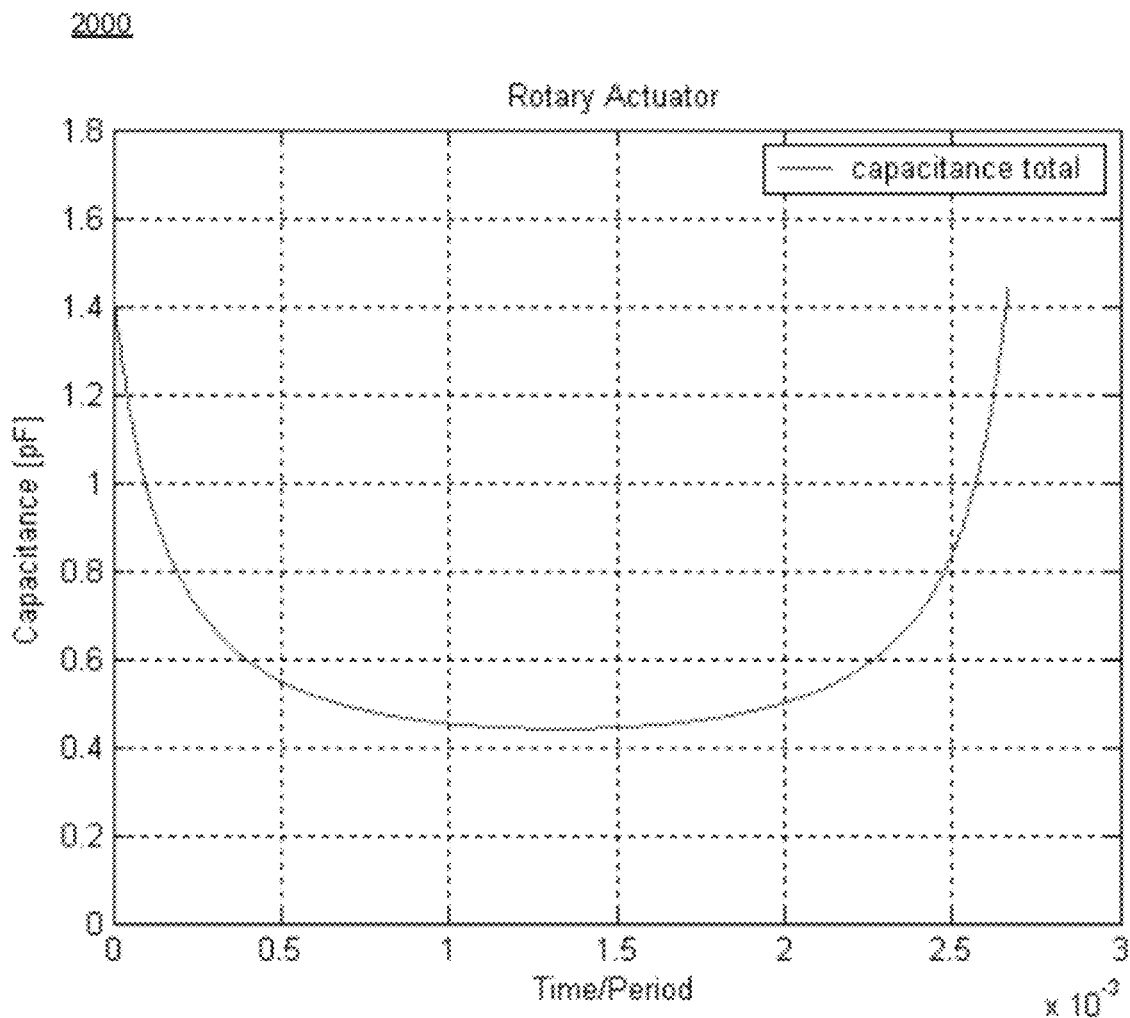
FIG. 20 depicts additional graphs for rotary actuator, Sn123, ½ year, 375 Hz, partial discharge configured in accordance with one embodiment of the present invention.
Figure 20B:
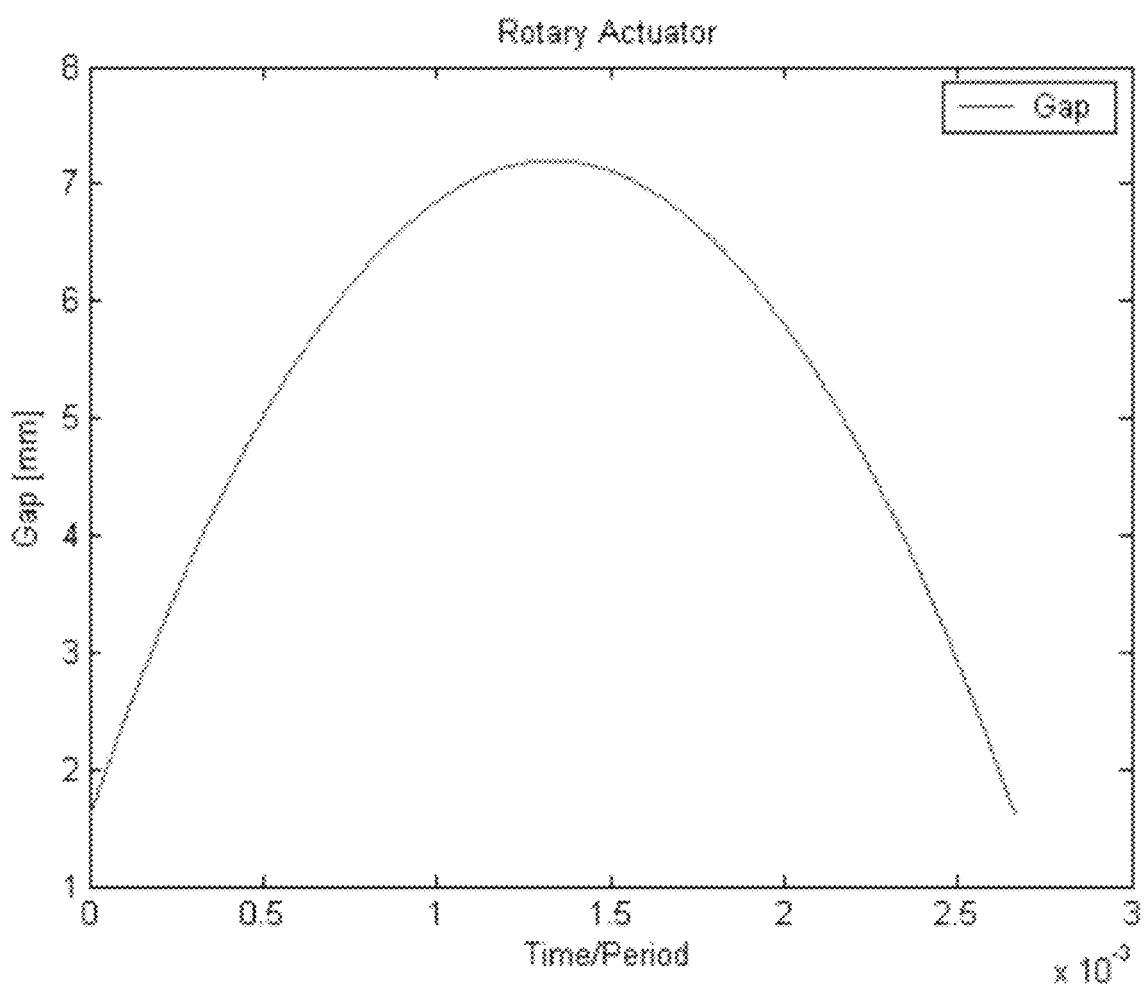
Figure 20C:
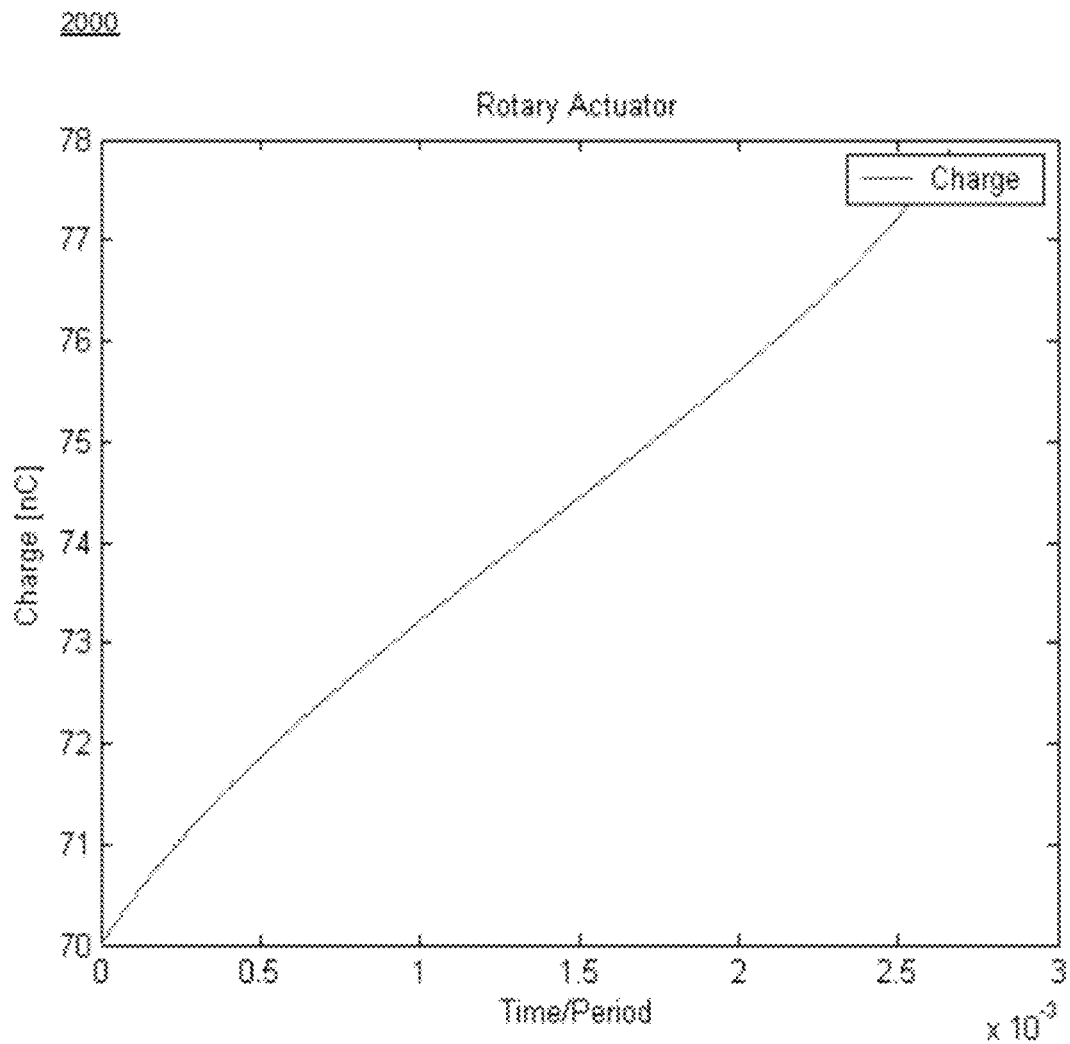

FIG. 20 depicts additional graphs 2000 for rotary actuator, Sn123, ½ year, 375 Hz, partial discharge configured in accordance with one embodiment of the present invention. Graphs depict capacitance per source vane FIG. 20A; gap narrows at the partial discharge locations FIG. 20B; and charge increases 10% over the cycle time, over the initial charge FIG. 20C. The capacitance increases when the source vane is in the throat of the chute, where the gap is the smallest. A symmetric capacitance may appear curious. In embodiments, for maximum power, the capacitance would become very large, with no slope, immediately after the source vane exits the throat of the chute. However, this case is improbable. The source vane, similar to the parallel plate example, always has capacitance to the plate it was just using to pull itself forward. In computer FEM simulations, the slope of the capacitance away from the chute, no matter the exact geometry, was similar to the slope of the capacitance into the chute. Hence, to avoid sharp edges and to keep the analysis somewhat analytical, a smooth taper in and out of the chute was chosen for embodiments, again similar to the parallel plate behavior.

Figure 21:
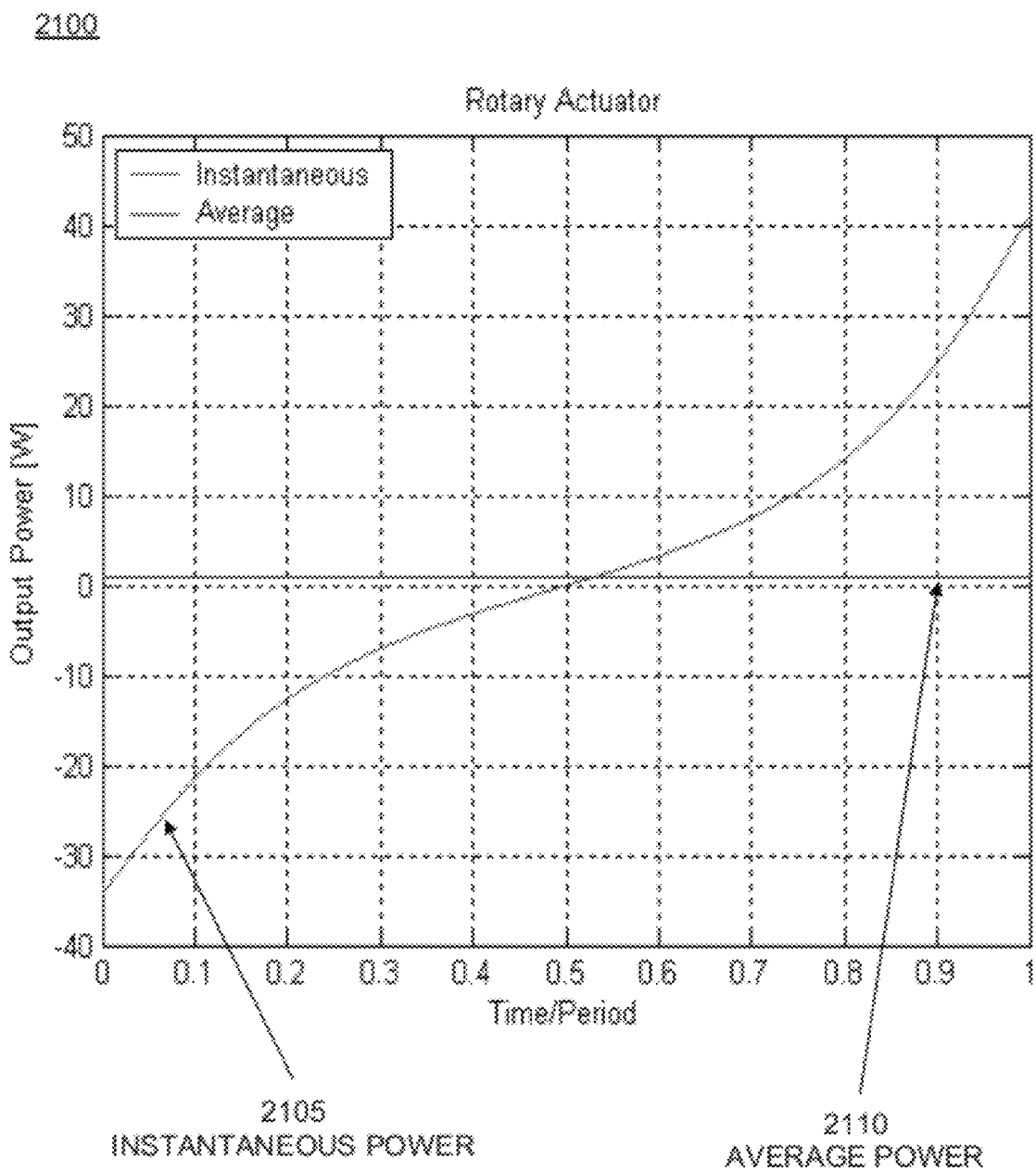
FIG. 21 depicts a graph for rotary actuator power with partial discharge configured in accordance with one embodiment of the present invention.

FIG. 21 depicts a graph 2100 for rotary actuator power with partial discharge configured in accordance with one embodiment of the present invention. Curves are instantaneous power 2105 and average power 2110. Instantaneous power is much larger than average power (difference between areas of both sides), using partial discharge. This results in an inefficient electrical conversion. Still, embodiments get more net power using partial discharge. Beta energy is going into crossing the gap, instead of heating the target metal. Line 2105 shows the instantaneous power using partial discharge. When the source vane is exiting the chute with the residual charge, there is almost as much work being performed as when the source vane is driving with the torque at the second half of the cycle. The difference between these powers in the negative and positive directions is the net power derived from the EA. As is evident, power is wasted to generate the small average power. However, notably, in embodiments, if partial discharge were not used, this instantaneous energy shown above would exist but as heat in the target metal instead of being used to cross the gap.

Figure 22:
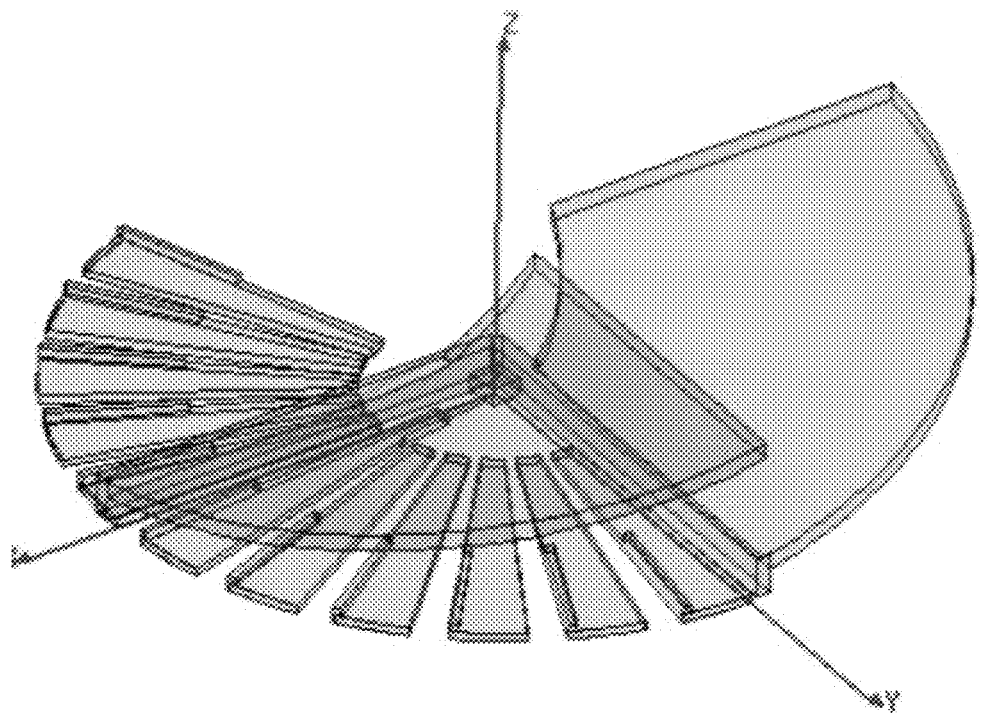
FIG. 22 depicts finite element model (FEM) results for capacitance vs. rotation, full discharge, all vanes present configured in accordance with one embodiment of the present invention.

FIG. 22 depicts finite element model (FEM) results 2200 for capacitance vs. rotation, full discharge, all vanes present configured in accordance with one embodiment of the present invention. Graphs are capacitance vs. rotation angle FIG. 22A and capacitance vs. time period FIG. 22B. Depicted are entrance into chute 2215, leaving chute 2220, and into chute 2225 for analytic model FIG. 22B. The graphs display the capacitance versus rotation angle, for FEM results and for the numerical analysis, for a 1 cm diameter rotary motor embodiment with full discharge. The analytic model 2210 gives similar behavior to the FEM 2205 results. The large roll-off in the capacitance around −10 degrees is due to leaving the chute. For embodiments, the voltage should be low during this part of the cycle, so the reverse torque will be much smaller than the attractive torque into the chute later in the cycle.

FIG. 23 depicts capacitance vs. rotation graph 2300, partial discharge, for a large gap, all vanes present, configured in accordance with one embodiment of the present invention. Curve segments include going into chute 2305 and leaving chute 2310. This embodiment geometry has a large gap in the throat of the chute, because partial discharge is assumed, for the 1 cm diameter motor. The slopes leaving and entering the chute are similar; hence the partial discharge technique will work. Note that the geometry is much different leaving the chute, compared to entering the chute, but the capacitances are the similar. The sharp edges in this embodiment may experience arcing. In contrast, the 3 cm diameter rotary embodiment for low current uses a smooth ramp in the target metal into and out of the chute.

Figure 24:
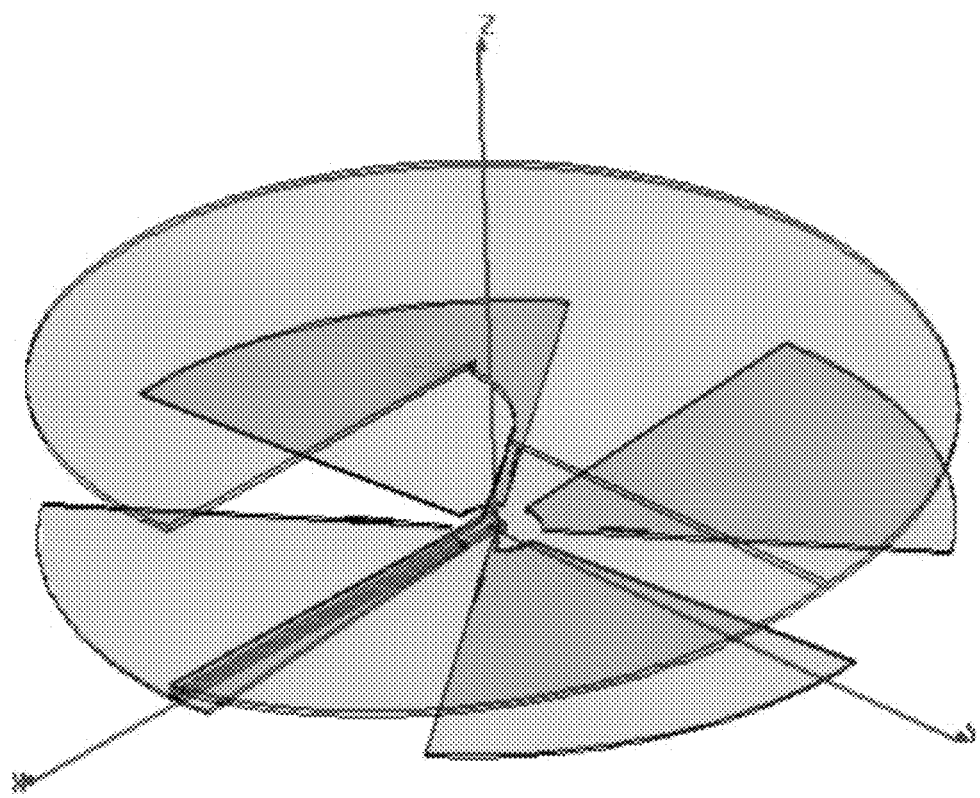
FIG. 24 depicts graphs for a low current embodiment configured in accordance with one embodiment of the present invention.

FIG. 24 depicts graphs 2400 for a low current embodiment configured in accordance with the present invention. Graphs are capacitance vs. rotation FIG. 24A and capacitance vs. time period FIG. 24B. This figure compares analytic capacitance model 2410 with FEM 2405, for the 3 cm diameter rotary motor. Into chute segments are designated 2415 for FIGS. 24A and 2420 for into chute for FIG. 24B. The graphs demonstrate that the magnitudes and slopes of the torque used in the analytic model are reasonable.

Figure 25:
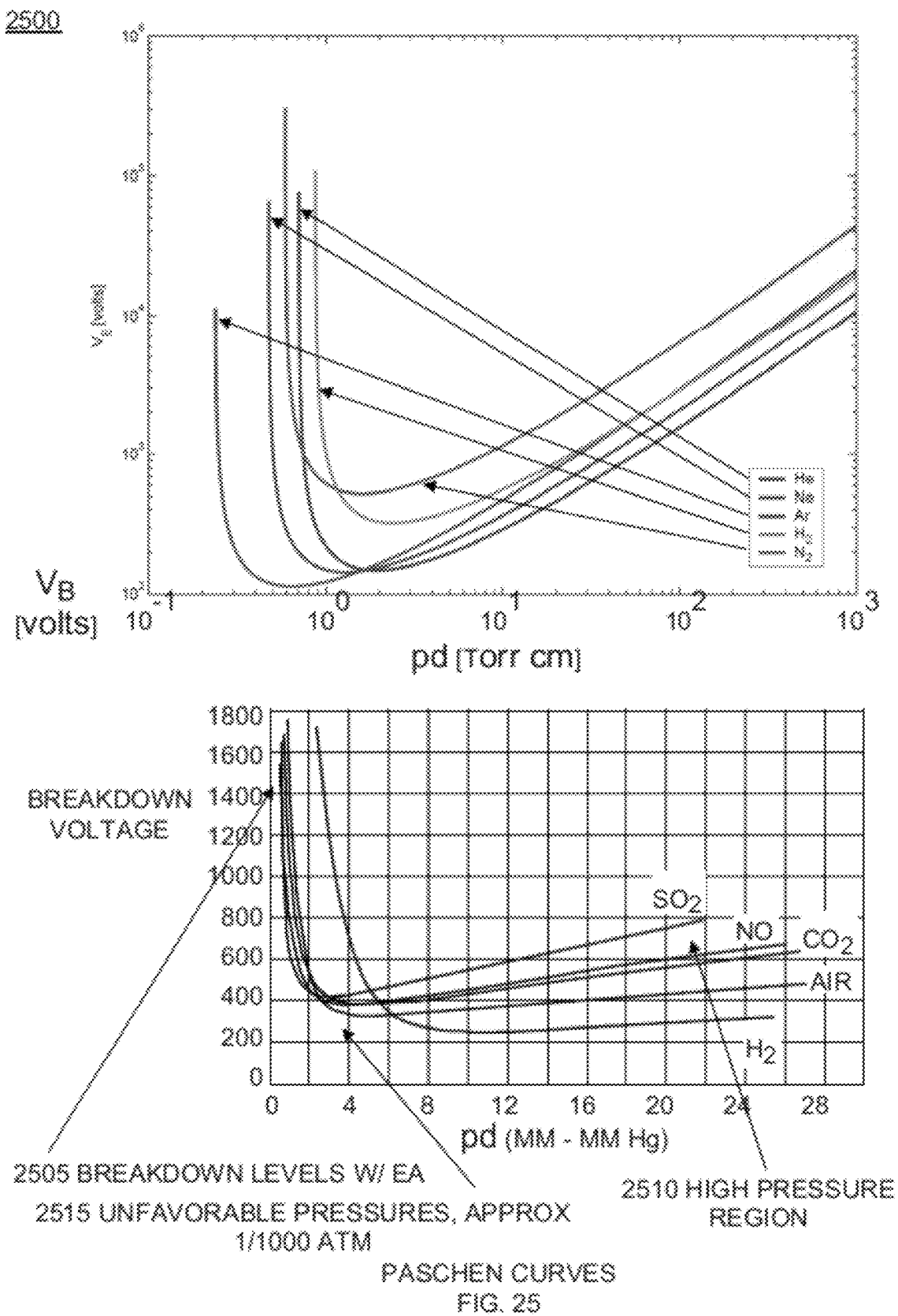
FIG. 25 is a graph of Paschen curves.

FIG. 25 are graphs 2500 of Paschen curves. Depicted are breakdown levels with EA 2505, high pressure region 2510, and unfavorable pressures approximately ⅟1000 atmosphere 2515. Use of vacuum for embodiments is derived from operation at high voltages. Breakdown voltage is traditionally represented as a function of pressure by the Paschen curves. As illustrated, air at standard pressure and temperature falls below the embodiments' breakdown voltage level. A vacuum condition meets the necessary values. Vacuum is employed in embodiments to achieve the highest power densities. Gas or dielectrics between plates will ionize due to the beta current, probably causing leakage current, and stopping some of the beta electrons from crossing. From the Paschen curve, for embodiments, vacuum needs to be approximately below 1 mm Hg, or about 0.001 atmospheres. Some embodiments may be worse off with a crude vacuum (at minimum on Paschen curve) than with 1 atmosphere. This is because the time between collisions is long enough that the kinetic energy of the ionized particles becomes large enough to ionize other particles. At highest vacuums, ionized particles are "ballistic"; they do not collide with other particles but only collide with the opposite metal plate. From independent collision analysis (estimate the probability of not inducing an ionizing collision as the beta electron crosses the gas), the vacuum requirement for embodiments is estimated to be on the order of approximately 0.001 atmospheres or better to avoid ionizing collisions.

FIG. 26 depicts a table 2600 of ionization and ranges of alpha and beta particles. 50 keV beta electrons travel 3.8 mm in air, indicating that there is significant ionization of the air. Faster electrons ionize less because there is less contact time. The significant ionization occurring in air due to the beta electron is an indication that the ionized/conductive gas will not allow a charge buildup on the opposite plates.

Predicated upon beta electron emission and capture characteristics, operation of parallel plate actuator embodiments employs high voltage, in excess of 100 kV, including a vacuum envelope. Operation of actuator embodiments at high voltage is feasible. Size is compatible with MAV/NAV operation. Motion transfer with a vacuum envelope may include a magnetic clutch or direct link to actuator bellows for motion transfer. Getters may be used in embodiments to handle material outgassing in order to preserve vacuum qualities and operate at high voltage. Operational voltages for embodiments fall into the category of high voltage and may employ techniques in order to prevent arching. Embodiments can be fabricated using the 3-D Micro Electromagnetic Radio Frequency Systems (3D-MERFS) process. Motion transfer outside the vacuum envelope can be through cam and follower for rotary motor embodiments. In neither case is the operation at high voltage impeded through attachment of the connection mechanism.

FIG. 27 depicts graphs 2700 illustrating specific power of beta and gamma emission sources for actuators. Graphs are beta and gamma sources power: specific power (dB) to 1 year FIG. 27A and specific power (dB) vs. days, no gamma FIG. 27B. Elements include Sn123 2705, Ca45 2710, S35 2720, Sr89 2725, and Cd115 2730. Note, however, that although use of a pure beta emitter has been selected in some embodiments for safety purposes, additional embodiments are envisioned. Other active sources can easily be accommodated provided safety considerations are accommodated. Thus, embodiments can use gamma or alpha emission sources as indicated by Sn123, Y91, Sr89, and Cd115 elements.

The beta emission process comprises a source material emitting electrons which are then captured by a target material. During the release and capture process, electrical work is performed which in turn is transferred into mechanical work in the form of rotation of the rotor.

Figure 28:
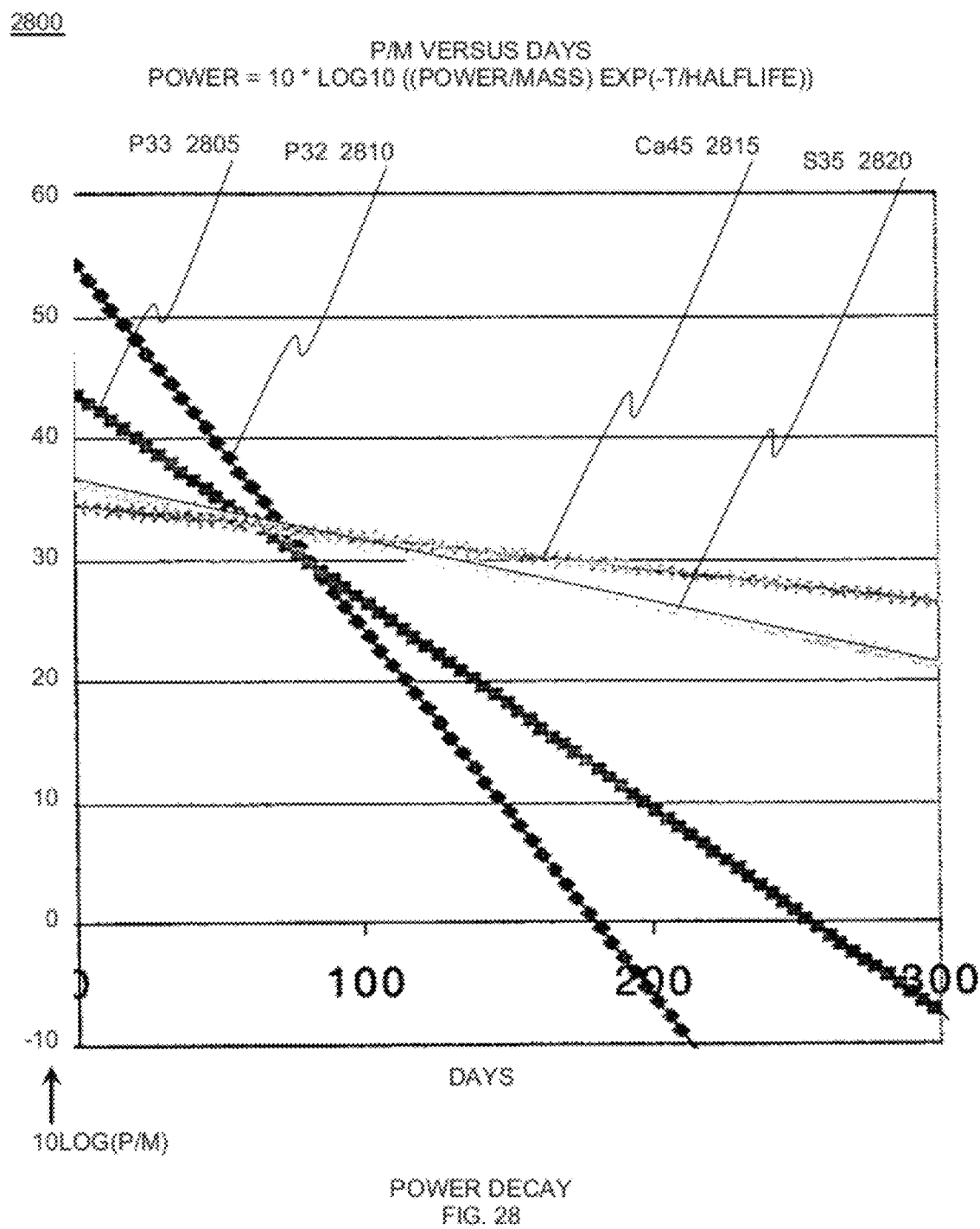
FIG. 28 is a graph illustrating power decay of beta sources for actuators configured in accordance with one embodiment of the present invention.

FIG. 28 is a graph 2800 illustrating power decay of beta sources for actuators configured in accordance with one embodiment of the present invention. Power/mass versus days is depicted for P33 205, P32 210, Ca45 215, and S35 220. Power=10*Log 10((power/mass) exp(-t/half life)). All beta radioisotopes are close to equal at 80 days. If they are used EA after 80 days, embodiments employ Ca45. If embodiments use the electrostatic actuator (EA) before 80 days, embodiments use P33 or P32. Therefore, depending on operational life time requirements, a specific beta emitter is chosen. Higher specific powers are achievable with sources which decay quicker, such as P32 or P33. However, longer operational lifetimes are possible with materials such as Ca45 and S35 if the lower specific power is sufficient in terms of achieved MAV/NAV performance.

Figure 29:
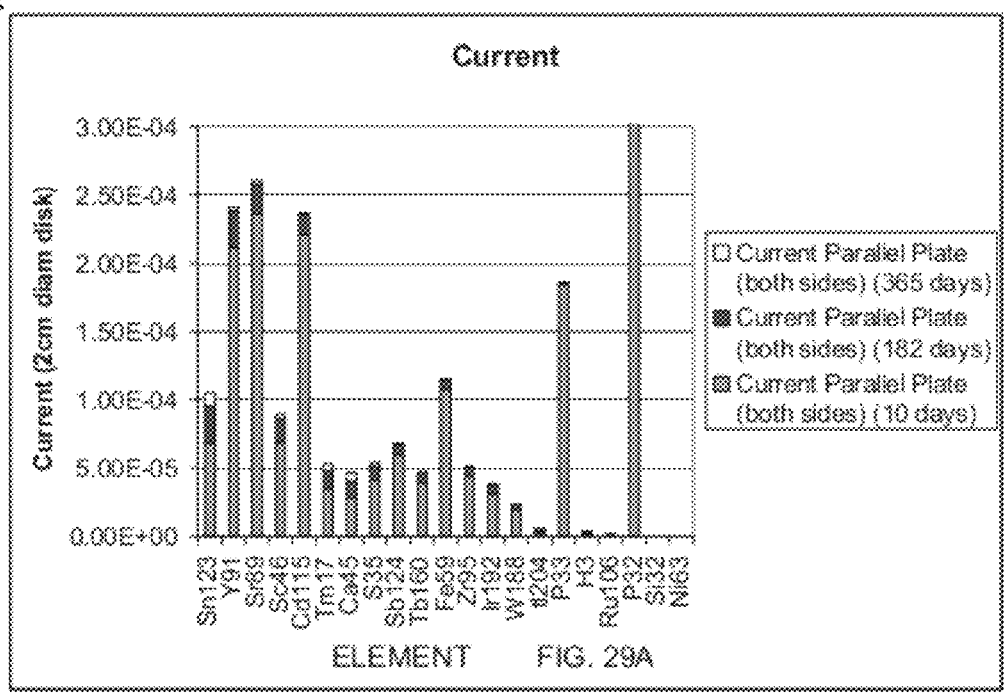
FIG. 29 depicts an element current chart and radioactive decay table.

FIG. 29 depicts 2900 an element current chart FIG. 29A and radioactive decay table FIG. 29B. In the chart, the current at time zero (blue bars) is much larger than the current at ½ year and 1 year. The decay process table FIG. 29B depicts alpha decay: current low 2905, P neutron decay: no charge transfer 2910, (electron) emitted, embodiment choice 2915, and monoenergetic, intensities not 100%, gamma decay likely 2920. Alpha decay has high energy, but the penetration depth out of the source film or into the target is very small (a few micro-meters, even with MeV alpha energies). Hence, the source film is very limited in thickness, which imposes a low limit on the current. One possible advantage of using Helium nuclei as charge carriers is that the secondary electron emission, which counteracts the desired current, may be less because a He-electron collision transfers much less energy to the electron than an electron-electron collision. Beta-decay is a candidate decay mode of electrostatic actuator embodiments. The penetration depth is relatively deep in a metal, and the source film is much less limited in thickness/current than alpha decay. Also, beta particles (electrons) will not travel very far in air or through skin, so the particles are safe, from a health standpoint. Internal Conversion is a candidate for the charge mechanism. An excited nucleus decays by transferring its energy to an inner atomic electron, which is ejected with a monoenergetic energy, unlike typical beta decay. However, the intensities are not 100% (probably less than 50%) and the extra intensity goes toward gamma emission.

For embodiments, specific power was calculated using: Sp=<E_Peak>*fc/m/T Where: <E_Peak>=Peak Beta Kinetic Energy m=Atomic mass of the source T=Half life of source material, and fc=Collection efficiency factor. This takes into account approximate energy spectrum and fixed collection voltage fc=0.073, held constant.

Ca45 is a contender for embodiments because the X-ray energy is relatively low, at 12 keV, and the X-rays are only generated 3 out of every million decays. Secondary X-ray emission from the target metal plates and from surrounding support structures, due to collisions with the beta particles, might yield X-rays of comparable energies and higher flux than Ca45. Hence, for embodiments, the target metal and additional structural metals need to be defined, with regard to allowable X-ray creation, before the low flux Ca45 X-ray is deemed a hazard or acceptable. Alpha particles can have large energy (1 MeV) but still the penetration depth out of the source material is very limited. Hence, the film thickness is very limited and the current is low. This low current results in low energy density. Another consideration is beta energy. The power of EA embodiments is largely driven by the maximum voltage (force $\sim V^2$), and voltages less than 10 keV may not generate significant electrostatic force.

FIG. 30 depicts energy graphs 3000 configured in accordance with one embodiment of the present invention. Graph FIG. 30A includes probability density showing mean energy 3005. Normalized average collection energy FIG. 30B shows embodiment collection point 3010. Beta electrons exhibit a spectrum of kinetic energies between zero and a peak energy E. The probability density p(E) of this distribution as a function of the kinetic energy E, may be roughly approximated by $$p(E)=3*(1-E/E_P)^2 \quad \text{Eq. 5}$$

This distribution is shown in the figure. It is heavily weighted towards the lower-energy end of the spectrum. From this distribution, it may be determined that the average kinetic energy of a beta electron is approximately $E_P/4$.

If beta electrons are collected at the voltage $V_C$, $0<=e*V_C<=E_P$, then the average collected energy per electron, $E_C(V_C)$, is given by $$E_C(V_C)=e*V_C \int p(E)dE = e*V_C*(1-e*V_C/E_P)^3 \quad \text{Eq. 6}$$

from $E_p$ to $eV_C$ where e is the electron charge. This collected energy, normalized to $E_P$, is a function of $V_C$, normalized to $E_P/e$. It has a maximum value of $$\max\{E_C\}=27*E_P/256 \quad \text{Eq. 7}$$

at $e*V_C=E_P/4$, the mean kinetic energy of the beta electrons. Thus, the optimal collection voltage is $E_P/(4*e)$. Assuming that there are N beta electron emitters per unit volume at their birth, then the beta electron generation density G at the birth of the emitters is given by $$G=N*\ln(2)/T \qquad \text{Eq. 8}$$

where T is the half life of the emitter. If all beta electrons are collected at the optimal voltage, then the maximum power density $P_c$ that can be obtained by collecting the electrons is given by $$P_C=\max\{E_C\}*G=0.073*E_P*N/T \qquad \text{Eq. 9}$$

The power generation density $P_C$ divided by the mass density of the beta electron emitter is then the specific power $P_S$ of that emitter. The specific power is a useful metric for comparing different beta electron emitters. Since the mass density of the beta electron emitter is m*N, where m is the atomic mass of the emitter, $$P_S=0.073*E_P/T/m \qquad \text{Eq. 10}$$

For some embodiments, current multiplication methods may be applied. Secondary electron emission from metal plates is possible, due to impact with beta electron. Solar cell analogy: a radioisotope can excite electron-hole pairs and induce a current source in the PIN junction. High voltages are not necessary, and the kinetic energy of the beta electron is used to ionize thousands of atoms and create a current. The voltage is determined by placing many PIN junctions in series. Coil transformer, from high impedance/low current to low impedance/high current analogy: have a radioisotope capacitor in a vacuum, and charge to the maximum voltage possible as determined by the isotope. Then discharge into a coil transformer at a very fast rate. A high current/low voltage conversion might be possible in embodiments, which could drive a low voltage electrostatic actuator or a motor.

FIG. 31 depicts a table FIG. 31A and graphs FIG. 31B and FIG. 31C of target radiation characteristics 3100. Secondary photon and X-ray spectrum of targets is considered. The lighter elements have the lower energy K-shell X-rays. Be has a 0.111 keV X-ray, which is very minor and would pass right through a human with very little probability of absorption. Note from the X-ray spectra shown on the right, that the resonant K-shell energies are clearly distinguished. This indicates that the background "breaking radiation" is very low at these 1 keV or larger energies.

FIG. 32 depicts a further table FIG. 32A and graph FIG. 32B of target radiation characteristics 3200. In embodiments, it is advantageous to have the incident beta electrons pass through the surface of the target metal as quickly as possible, in order to have less likelihood of transferring energy to an electron near the surface. Hence, the beta electron should still have a few keV or more of energy remaining when it collides with the surface of the target metal. (In a "soft" electrostatic collision, less momentum is transferred when the collision is shorter, due to less impulse, i.e., same repulsive force between two electrons but less time for them to interact with each other.) According to the chart, if the incident beta electron strikes the target metal with approximately 200-500 eV of kinetic energy, then there will be on the order of 1 secondary electron per incident beta electron. If the incident beta electron strikes the target with over 2 keV or so, then there will be much less than 1 secondary electron per incident beta electron. The tables of secondary electrons provide information on the energy EII when the ratio of the secondary to incident electron is 1, which typically occurs between 300-2000 eV. Hence uncertainty when the ratio goes well below 1 when the incident beta electron has many keV of kinetic energy. Rougher surfaces have less secondary electrons, for example, compare graphite and soot. Surface roughness creates more surface area to re-capture any ejected secondary electrons. However, this surface roughness may encourage corona currents or gas breakdown, due to charge and E field buildup at sharp points. Copper has more secondary electron emission than Aluminum at 1.5 keV, and, presumably, at all higher energies, due to higher electron density at the surface. Embodiments employ a surface film of a light metallic element.

Another source of secondary electrons, besides collisions on the surface, is Auger electrons. When the incident beta electron loses enough energy that its velocity is relatively slow but it still has a few keV of energy, then the probability that the beta electron will excite a resonant energy level within the atoms goes up. The beta electron collides with an inner electron and ejects it, creating a vacant inner shell. A valence electron then drops to the lower energy level to fill the vacant inner shell, and, in doing so, transfers this resonant energy to another electron, which then might escape from the target metal. Hence, in embodiments, we want the incident beta electrons to penetrate well beyond the surface of the target metal before they lose enough energy to excite these Auger electrons. This is another reason to allow the beta electrons to retain more than a few keV of kinetic energy before colliding with the target metal, and is another reason to use light-element target metals, which have low resonance K-shell energies. Hence, the electron will penetrate deeper before exciting the Auger electrons. Auger electrons are used as a tool to identify or characterize elements within materials, so they can be ejected from the surface of the material.

FIG. 33 depicts isotope summary tables 3300. Table FIG. 33A parameters include Collection Voltage=~0.25; Collection Current=~0.3; Hence VI Power ~0.25*0.3=0.075; Energy remaining after escaping from source film=0.7; Best Case fraction of total mass is source mass=0.5. The table presents a list of beta electron emitters, some of their properties, and realizable power outputs using an EA. These are the emitters that: (1) have half lives in excess of 10 days; (2) are not alpha emitters or strong gamma emitters and (3) do not decay into strong alpha or gamma emitters. As a result, Sr90, Ru106 and Tl204 are omitted from the table because they all decay to products that are strong gamma emitters. The table however, does include Ca45, which is itself a gamma emitter with the small probability of less than once per $10^8$ events and Sn123 which is a gamma emitter with excellent half life characteristics and limited decay products. $P_S$ represents the greatest electrical power per mass that can be extracted from a beta electron emitter by capturing the electrons. In practice, however, this specific power can not be achieved by an actuator for several reasons. First, $P_S$ as derived does not include the mass of the collector, the core actuator or its package. Second, a working actuator can not collect all, or perhaps even many, electrons at the optimal collection voltage. This voltage might also, for example, exceed breakdown limitations. Third, no actuator can achieve 100% efficiency. Finally, secondary electron emission at the collector, or any gas within the actuator that is ionized by collisions with the beta electrons, might shunt collected power. Therefore, $P_S$ as given, may be an optimistic case.

Values for $P_S$ are given in Table FIG. 33A above. From the table it is apparent that, for embodiments, four beta electron emitters can meet the specific power requirements of 0.1 W/gm when fabricated into an actuator. They are P32, P33, S35 and Ca45. However, as mentioned above, Ca45 is also a gamma emitter, although at a very low level. Further, P32, P33 and S35 meet the specifications with a sufficient margin to permit the likely fabrication of a practical actuator for <1 year operation. For embodiments, Sn123 meets both the minimum acceptable power density and operational life considerations.

Regarding conversion efficiency, the optimal collection voltage is about ¼ the peak voltage, and this allows approximately 0.3 of the beta electrons to cross the gap. This ¼ peak voltage yields the highest VI power product. If the voltage is higher, then the current drops dramatically. The source film for embodiments needs to be about half the penetration depth, in order to yield the maximum current. Hence, some energy is lost as the beta electron escapes from the source film. The energy lost from half the penetration depth was assumed to be 30%, not 50%, because most energy is lost when the electrons are slower and have larger interaction times. The best case mass fraction for embodiments is 0.5. Half the mass is source material, and half the mass is target material, which is not radio-active. The product of these four terms—voltage fraction, current fraction, escape energy, and best case mass ratio—is 0.26. For Table FIG. 33B, Average VI power to Max VI instantaneous power=0.36 Average Mechanical Power to Average VI power=0.78 and Best Case fraction of total mass is source mass=0.5.

FIG. 34 depicts graphs of P32 rotary actuator power 3400 configured in accordance with one embodiment of the present invention. Graph FIG. 34A depicts 20 vanes for rotary embodiment seven, FIG. 2C. Graph FIG. 34B depicts 4 vanes for rotary embodiment seven, FIG. 2C. Parameters comprise: a frequency of 100 Hz, Voltage of 55 kV, E max of 2.5e7 V/m, and Gap of 2 mm. Results are 5 Watts at 55 kV using 20 vanes and 22 Watts at 330 kV using 4 vanes.

Figure 35:
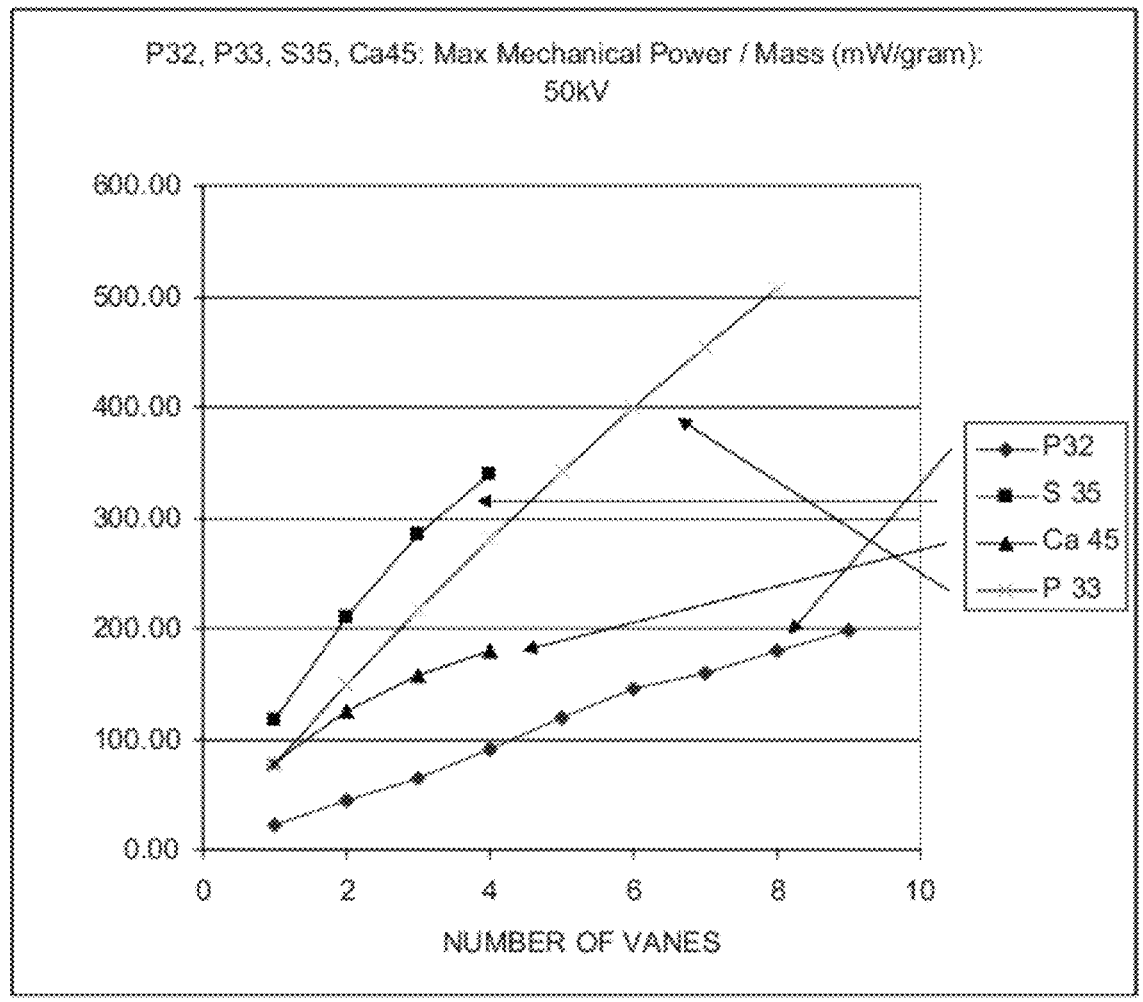
FIG. 35 depicts a graph of isotope energy power to mass ratio (P/M) versus number of vanes configured in accordance with one embodiment of the present invention.

FIG. 35 depicts a graph 3500 of isotope energy power to mass ratio (P/M) versus number of vanes configured in accordance with one embodiment of the present invention. Parameters comprise: a frequency of 100 Hz, Voltage of 50 kV, E max of 2.5e7 V/m, and Gap of 2 mm. The graph shows maximum mechanical power/mass (P/M) in mW/gram for P32, P33, S35, and Ca45 as a function of the number of device vanes. Maximum mechanical power is assumed to be ¼ the maximum VI power. Increase film thickness as the number of vanes increases. Can not increase thickness beyond the penetration depth, so, in embodiments, some elements may be limited in the number of vanes. Embodiments would get double the Power/Mass if rotate at 200 Hz. Both P33 and P32 can tolerate the extra film thickness. It represents an advantage of a rotary actuator. The power density is only limited by the current that can be generated, which is determined by the usable thickness of the source radioisotope film and by the half-life. If the current can be increased substantially, such as with P32 and P33, then rotary actuator embodiments can be made to spin at greater rates, say 500 to 1000 Hz, for example. Embodiment power densities will then be 5 to 10 times larger than those shown in the graph.

The graph also indicates an advantage of only using a beta decay energy that is just above the voltage that will be obtained in embodiments. Hence, the metal target thickness will be at a minimum for the amount of energy it is stopping. For example, if P32 is used without consideration of the stopping metal thickness, and if the voltage is limited to 50 kV, then significant metal, hence added weight, is included in embodiments, without benefit. Since the rotary motor can run at 50 kV, embodiments are candidates for materials such as P33, for example, which is a choice from the current and energy perspective in embodiments.

The rotary actuator power can be restricted in embodiments if the maximum current from the isotope is weak and the rotary actuator can not spin very fast. Hence, the rotary actuator is very good during the initial timeline of the decay (within one half-life).

Following is a detailed comparison between the elements, using S35 as the baseline.

S35 ISOTOPE

For embodiments, the maximum voltage using Sulfur 35 is probably limited to approximately 40 kV, which means that the target metal can be the thinnest for the isotopes examined here. This is approximately ¼ of the maximum beta energy, and is the optimal collection voltage. For embodiments, Sulfur 35 can have a maximum source thickness of approximately 0.2 mm, because the beta electrons need to be able to escape from the source material, and the penetration depth of the beta electrons, at the maximum 167 keV, is only a little larger than 0.2 mm. Using an 87 day half life, this 0.2 mm source thickness is enough to charge 4 times during a 100 Hz cycle; hence there can be 4 chutes. For embodiments, there also needs to be excess kinetic energy on the beta electron to be able to cross the voltage gap. Charge time should be relatively insensitive to the source wedge width, because the capacitance increases proportional to the width. Hence, if we have a limited current, due to restricted film thickness (due to 167 keV beta energy) and longer half-life (half life of S35 is 87 days), the charge time will be longer and embodiments are limited to only a few chutes or parallel plates. For S35, embodiments are limited to 4 chutes based on the limited current. Using 4 chutes, Power/Mass 300 mW/gm.

Ca45 ISOTOPE

Calcium 45 has similar behavior to Sulfur 35, except the beta energy is 258 keV instead of 167 keV, and the half-life is 162 days instead of 87 days. The film thickness can be 50% thicker due to the large beta energy, but the total current will be around 0.75 the S35 current due to the factor of two longer half-life. The current is enough to charge the capacitor 3 times during a 100 Hz cycle, and hence there can be 3 chutes. In embodiments, the optimal collection voltage can be 55 kV (or a little larger) instead of 40 kV for S35, which means more power but thicker target metal. Hence, although the longer half life reduces the current by a factor of two, the 30% or so larger voltage compensates for the reduced current. In this figure, 50 kV is assumed, regardless of source, so S35 is assumed to charge to 50 kV instead of 40 kV, and S35 has better Power/Mass than Ca45. However, if we incorporate the 40 kV voltage instead of 50 kV for S35, then Ca45 and S35 would have very close Power/Mass. Using 3 chutes, Power/Mass 170 mW/gm.

P33 ISOTOPE

P33 has greater differences from Sulfur 35. The beta energy is 249 keV instead of 167 keV, and the half-life is 25 days instead of 87 days. For embodiments, the film thickness can be 50% thicker due to the large beta energy, and the half-life is three times shorter; hence the total current will be around four times larger than the S35 current. The current in embodiments is enough to charge the capacitor 16 times during a 100 Hz cycle, and hence there can be 16 chutes. The optimal collection voltage can be 55 kV (or a little larger) instead of 40 kV for S35, which means more power but thicker target metal. For 16 chute embodiments, by extending the curve, the Power/Mass ~1000 mW/gm.

P32 ISOTOPE

P32 has the greatest differences from Sulfur 35. The beta energy is 1700 keV instead of 167 keV, and the half-life is 10 days instead of 87 days. The film thickness in embodiments can be eight times thicker due to the large beta energy, and the half-life is nine times shorter; hence the total current will be around 70 times larger than the S35 current. The current is enough to charge the capacitor 280 times during a 100 Hz cycle, and hence there can be 280 chutes, and the voltage can go up to 400 kV.

Other considerations are applied next regarding power. If we just assume that the collection voltage can only be 50 kV based on breakdown, then we only use the large beta energy to create large currents, but we need very thick metal targets to trap the beta electrons (1.2 mm). If 16 chutes are implemented, based on breakdown between source wedges, then, by extending the curve, the Power/Mass 400 mW/gm. For embodiments, P32 would be better than P33 if the actuator can be charged to more than 50 kV. In embodiments, one benefit of the large film thickness is that the source material can be "overstuffed" and an adequate current can be generated for lifetimes 5 or 10 times larger (50 to 100 days) than the element half life of 10 days.

Figure 36:
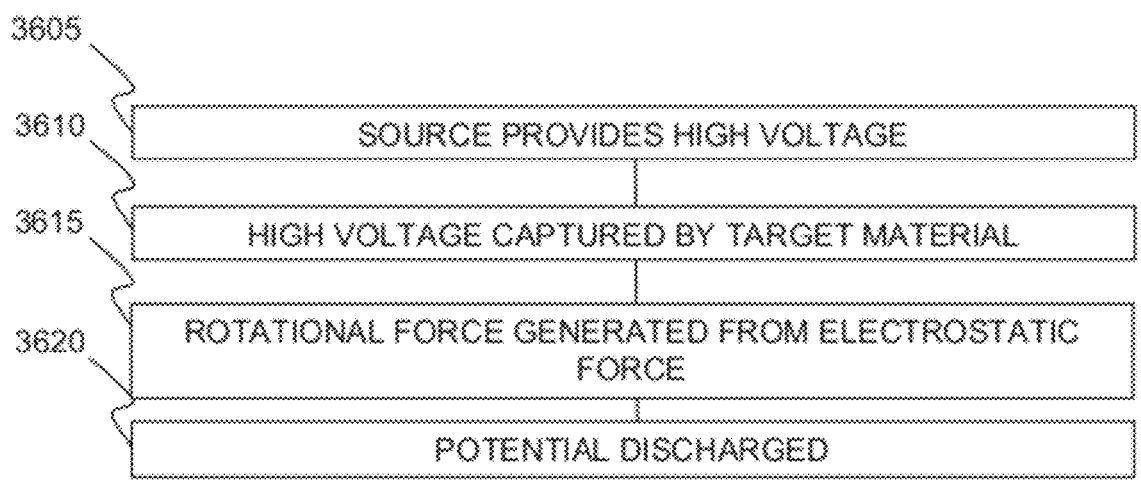
FIG. 36 is a flow chart of a method of a source providing electrons to a target material wherein work is performed configured in accordance with one embodiment of the present invention.

FIG. 36 is a flow chart 3600 of a method of a source providing electrons to a target material wherein work is performed configured in accordance with one embodiment of the present invention. The steps comprise transmitting high voltage from a source 3605, high voltage captured by target material 3610, rotational force generated by electrostatic force 3615, and potential discharged 3620.

In embodiments, conversion from electrical to mechanical power is accomplished by direct magnetic coupling to the rotor through a vacuum housing. Once outside the housing, a propeller is attached to the far side of the magnetic coupling for direct drive, thus eliminating the losses through a mechanical gear box. The embodiment rotational frequency of the actuator can be adjusted to specifications the propeller such as diameter to optimize propulsion, including efficiency.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A rotary electrostatic actuator (EA) apparatus comprising:
   a high voltage source of at least about 40 kV;
   a target material receiving voltage from said high voltage source;
   wherein a source vane is attracted to said target material as a result of charges attracted to higher E fields;
   wherein said actuator implements partial discharge; and
   wherein said partial discharge comprises a storage capacitor re-charging said target.

2. The device of claim 1, wherein said source comprises a radioisotope emission high voltage source.

3. The device of claim 2, wherein said source comprises S35.

4. The device of claim 2, wherein said source comprises P32.

5. The device of claim 2, wherein said source comprises P33.

6. The device of claim 2, wherein said source comprises Ca45.

7. The device of claim 2, wherein said source comprises Sn123.

8. The device of claim 1, wherein said source comprises at least one of piezoelectric crystals and Van de Graff generator.

9. The device of claim 1, wherein said actuator is a disk rotor.

10. The device of claim 1, wherein said actuator is a vertical wall rotor.

11. The device of claim 1, wherein said actuator is a stacked rotor.

12. The device of claim 1, wherein said source comprises a replaceable source.

13. An electrostatic rotary actuator method comprising:
    providing emission from a source;
    capturing said emission by a target material;
    generating rotation from electrostatic force; and
    discharging developed potential;
      wherein said actuator implements partial discharge; and
      wherein said partial discharge comprises a storage capacitor re-charging said target.

14. The method of claim 13, wherein said source is a radioisotope providing said emission.

15. The method of claim 14, wherein said source is a low atomic number, below about 17, beta emitter source.

16. The method of claim 14, wherein said radioisotope source further provides electrical power.

17. The method of claim 13, wherein said step of discharging comprises partial discharge.

18. A radioisotope fueled electrostatic disk rotary actuator nano air vehicle apparatus comprising:
    two pairs of chutes comprised of metal, wherein said two pairs of chutes comprise a surface film of a light metallic element;
    a rotating vane disk, between said two pairs of chutes and coaxial with said two pairs of chutes, said rotating vane disk comprising twenty four source vanes comprising beta-emitting radioisotope comprising at least one of S35 and Ca45, wherein said radioisotope comprises a source film with a thickness of about approximately one half penetration depth, whereby current is a maximum;
    a housing comprising a lead-plated vacuum envelope, enclosing said two pairs of chutes and said rotating vane disk, whereby emission products of said radioisotope are contained, said vacuum envelope is sputtered deposition plated with a lead layer of about approximately one micron, whereby surrounding area is protected from soft X-rays, and beta upset of localized electronics is prevented; and
    wherein rotation of said rotary actuator is magnetically coupled directly to a propeller component, thereby eliminating losses due to a mechanical gear box, whereby propulsion is provided to said nano air vehicle.

* * * * *